United States Patent
Aso et al.

(10) Patent No.: US 7,742,396 B2
(45) Date of Patent: Jun. 22, 2010

(54) COMMUNICATION CONTROL METHOD, ADDRESS MANAGEMENT NODE, AND MOBILE NODE

(75) Inventors: Keigo Aso, Kanagawa (JP); Jun Hirano, Kanagawa (JP)

(73) Assignee: Panasonic Corporation, Osaka (JP)

( * ) Notice: Subject to any disclaimer, the term of this patent is extended or adjusted under 35 U.S.C. 154(b) by 182 days.

(21) Appl. No.: 11/909,790

(22) PCT Filed: Mar. 29, 2006

(86) PCT No.: PCT/JP2006/306500

§ 371 (c)(1),
(2), (4) Date: Sep. 26, 2007

(87) PCT Pub. No.: WO2006/104202

PCT Pub. Date: Oct. 5, 2006

(65) Prior Publication Data

US 2009/0052316 A1    Feb. 26, 2009

(30) Foreign Application Priority Data

Mar. 29, 2005  (JP) .............................. 2005-096371
Mar. 22, 2006  (JP) .............................. 2006-079751

(51) Int. Cl.
*G01R 31/08*  (2006.01)
*H04W 4/00*  (2009.01)
*H04J 3/16*  (2006.01)

(52) U.S. Cl. .................. 370/216; 370/328; 370/465
(58) Field of Classification Search .............. 370/328, 370/338, 465, 241, 401; 709/220, 228; 455/435.1
See application file for complete search history.

(56) References Cited

U.S. PATENT DOCUMENTS 7,068,635 B2 *   6/2006   Dempo ....................... 370/338

(Continued)

FOREIGN PATENT DOCUMENTS

CN    1455555    11/2003

(Continued)

OTHER PUBLICATIONS

PCT International Search Report dated Jun. 23, 2006.

(Continued)

*Primary Examiner*—Nittaya Juntima
(74) *Attorney, Agent, or Firm*—Dickinson Wright PLLC

(57) ABSTRACT

A technique is disclosed whereby, while a MN (mobile node) is separated from a home network, the status available on a home network is obtained, and a communication path is optimized for a packet to be transmitted between the MN and a CN (correspondent node) via a HA (home agent). According to this technique, an HA 20 that manages a plurality of home addresses allocated to an MN 10 detects communication statuses of, for example, an ISP1 and an ISP2, and selects a home address that is designated, for a packet transfer to be performed from the MN, via the HA, to a CN 15, as a source address for the inner packet of an encapsulated packet to be transmitted from the MN to the HA. Since the MN designates this home address as the source address for the inner packet, a packet decapsulated and transferred by the HA is delivered to the CN via the ISP1 or the ISP2 in a superior communication status.

5 Claims, 15 Drawing Sheets

U.S. PATENT DOCUMENTS

| | | |
|---|---|---|
| 2003/0208568 A1* | 11/2003 | Inoue et al. .................. 709/220 |
| 2004/0202126 A1 | 10/2004 | Leung et al. |
| 2005/0020265 A1 | 1/2005 | Funabiki et al. |
| 2005/0047348 A1 | 3/2005 | Suzuki et al. |
| 2005/0102415 A1 | 5/2005 | Ishiyama et al. |
| 2006/0129630 A1* | 6/2006 | Catalina-Gallego et al. . 709/203 |
| 2007/0036115 A1* | 2/2007 | Ono et al. .................... 370/338 |

FOREIGN PATENT DOCUMENTS

| | | |
|---|---|---|
| JP | 2000-332813 | 11/2000 |
| JP | 2003-298635 | 10/2003 |
| JP | 2004-007578 | 1/2004 |
| JP | 2004-247129 | 9/2004 |
| JP | 2005-033470 | 2/2005 |
| JP | 2005-072685 | 3/2005 |
| WO | 03096650 | 11/2003 |

OTHER PUBLICATIONS

E. Nordmark, et al. "Multihoming L3 Shim Approach," Internet-Draft, Jan. 2005, pp. 1-27.

J. Arkko, "Failure Detection and Locator Selection in Multi6," Internet-Draft, Jan. 2005, pp. 1-26.

R. Draves, "Default Address Selection for Internet Protocol version 6 (IPv6)," RFC3484, Feb. 2003, pp. 1-24.

D. Johnson, et al. "Mobility Support in IPv6," RFC3775, Jun. 2004, pp. 1-165.

Chinese Office Action dated Dec. 11, 2009.

* cited by examiner

FIG. 4A

| HA IP ADDRESS/ID | MULTIHOMING INFORMATION TRANSMITTED BY HA | |
|---|---|---|
| | DESIRABLE HoA INFORMATION TO BE USED BY MN | HA PLURAL ADDRESS INFORMATION |
| | HoA | HA ADDRESS A, HA ADDRESS B, .... |

FIG. 4B

| IP ADDRESS/ID FOR OTHER NODE | MULTIHOMING INFORMATION TRANSMITTED BY OTHER NODE | |
|---|---|---|
| | DESIRABLE HoA INFORMATION TO BE USED BY MN | PLURAL ADDRESS INFORMATION FOR OTHER NODE |
| | — | CN ADDRESS A, CN ADDRESS B, .... |

FIG. 7

| MN IP ADDRESS/ID | USEFUL INFORMATION FOR SELECTING DESIRABLE HoA TO BE USED BY MN | | | | | |
|---|---|---|---|---|---|---|
| | INFORMATION 1 | INFORMATION 2 | INFORMATION 3 | INFORMATION 4 | INFORMATION 5 | INFORMATION 6 |
| | ISP OPERATING STATE INFORMATION | ISP CONGESTION INFORMATION | ISP ROAMING INFORMATION | INNER PACKET TRANSFER DESTINATION STATUS INFORMATION | ISP PRIORITY INFORMATION | QoS PATH STATE INFORMATION |

COMMUNICATION CONTROL METHOD, ADDRESS MANAGEMENT NODE, AND MOBILE NODE

TECHNICAL FIELD

The present invention relates to a communication control method for performing communication employing IP (Internet Protocol) and an address management node and a mobile node, and relates particularly to an address management node and a mobile node, during which both a multihoming function and a mobile function are mounted, and a communication control method for controlling communication to be performed between these nodes.

BACKGROUND ART

Conventionally, there is a configuration called multihoming that facilitates connections with a plurality of Internet service providers (ISPs). The state wherein a site has a multihoming configuration is especially called site multihoming. Hereinafter, a site that has a multihoming configuration is called a multihomed site, and a subnet (a subnetwork) belonging to a multihomed site is called a site multihoming network.

Site multihoming will now be described while referring to FIG. 16. FIG. 16 is a diagram showing an example network configuration for explaining site multihoming for the conventional art.

In FIG. 16, a site 1 is shown that establishes a connection with a plurality of ISPs (an ISP1 and an ISP2) and that maintains, via these ISPs, an access to the Internet 1601, which is an IP network. This site 1 also includes a subnet A and a subnet B. Therefore, the site 1 is a multihomed site, and the subnets A and B are site multihoming networks.

Site multihoming is a technique used for multiplexing a connection path for the Internet 1601, and the employment of site multihoming produces an effect such as an improvement in failure proofing for accessing the Internet 1601 using a communication node 1602 in site 1. For example, the communication node 1602 in site 1 is so designed that it enables the accessing of the Internet 1601 via two ISPs, i.e., ISP1 and ISP2, or in communicating with a correspondent node (CN) via the Internet 1601.

Since prefixes (network prefixes) are respectively transmitted by ISP1 and ISP2 to site 1 shown in FIG. 16, these prefixes can be employed in the subnets that belong to site 1. Therefore, for example, the communication node 1602 that is connected to subnet A can generate a plurality of addresses formed using the prefixes for both ISP1 and ISP2.

In order to obtain a multihoming effect, the communication node 1602 must switch addresses, as needed, to be used for communication. For a case involving a transmission packet, the multihoming effect is obtained by employing a source address to determine which ISP is to be passed through, and for a case involving a reception packet, the multihoming effect is obtained by employing a destination address to determine which ISP is to be passed through.

Furthermore, as a method whereby a communication node that has been set in a multihomed state by the site multihoming employs a plurality of addresses to communicate with a correspondent node, the IETF SHIM6 Working Group has proposed a method whereby a plurality of addresses are managed within a network layer, and for an upper layer, addresses are mapped using a single identifier, so that the presence of a plurality of addresses is hidden (see, for example, non-patent document 1 below).

Further, reasons that the communication node switches addresses can, as described in non-patent document 2 below, be cases, for example, wherein various switching reasons have occurred in accordance with communication statuses, such as a case wherein a explicit notification, such as a disconnection notification, etc., has occurred because an Ack (Acknowledgement) message was not received from a TCP (Transfer Connection Protocol) layer, a case wherein a recovery is to be performed upon the occurrence of a failure due to an ISP that is currently being employed, a case wherein a load imposed on an ISP is to be dispersed, and a case wherein congestion is to be controlled.

Further, various other factors are also possible, such as a case wherein an ISP to be employed is changed in accordance with an MN (Mobile Node), a CN (Correspondent node), or an HA (Home Agent) that manages the address of the MN and the contents of preference information for a home network (i.e., a case wherein the occurrence of a reason for switching is other than a reason related to a communication status caused by the communication node side or a network side that includes the HA). Furthermore, as a method for selecting a new address to be employed after these reasons for switching have occurred, a static selection method described in non-patent document 3 below, or a method, as described in non-patent document 2, for example, for employing the results obtained by dynamically checking the probability that the address has been reached, can be employed.

When a communication node is to transmit a packet to a correspondent node by switching source addresses, the communication node must notify the correspondent node in advance of a plurality of addresses to be employed for this switching, and a message for transmitting this information is also referred to in non-patent document 1. It should be noted that, as a method for notifying the correspondent node of a plurality of addresses of the communication node that is a source, not only a method proposed in non-patent document 1, but in addition, for example, there is a method, described in non-patent document 4, for enclosing the addresses in a message related to a different protocol, such as a binding update message for a mobile IP, that can also be employed. Thus, even when receiving packets for which different source addresses are designated, the correspondent node can determine that they were transmitted using the same communication node.

A mobile IP described in non-patent document 4 will be briefly described. For an MN that is a communication node in the mobile IP, at least one HoA (Home Address) is assigned that is related to its own home network. In a case wherein this MN has been moved to another subnetwork (a foreign network), the MN obtains at least one CoA (Care-of Address) in the subnetwork to which the MN was moved, and notifies the HA in the home network of information (binding information) indicating that a correlation exists between the obtained CoA and the assigned HoA in the home network. Therefore, since the HA receives, as a proxy, a packet transmitted to the HoA of the MN, and transfers the packet addressed to the CoA, the MN can receive the packet addressed to the HoA, even in a case wherein the MN is present in the foreign network.

In addition, in a case wherein an MN that was moved to a foreign network transmits a packet, the MN generates an encapsulated packet (an outer packet) by encapsulating a packet addressed to the HA, and transmits the encapsulated packet. FIG. 17 is a diagram showing an example encapsulated packet to be generated, according to the conventional art, in a case wherein an MN transmits a packet to a CN. As shown in FIG. 17, the address of the HA is set as a destination address in the header (the external header) of an encapsulated packet, and the CoA of the MN is set as a source address. On the other hand, since the inner packet is the packet for substance to be delivered to a CN, the address of the CN is set as a destination address, and the HoA of the MN is set as a source address.

When the HA designated as the destination address in the external header receives the encapsulated packet transmitted by the MN, the HA extracts the inner packet, by decapsulating the received packet, and transfers the extracted inner packet. The CN receives this as a normal packet transmitted by the MN. Through this processing, the MN in the foreign network can still transmit, to the CN, a packet for which the HoA of the MN is designated as a source address.

Further, in a case wherein the home network of an MN is a site multihoming network, since a plurality of prefixes are valid on this home network, the MN can employ a plurality of home addresses. And when the MN is not moved (i.e., the MN is connected to its own home network), the connected network (the home network) is a site multihoming network, so that an address (which may be called an appropriate address) that it is desirable that the MN employs can be determined, while taking into account address information, which is exchanged with the correspondent node, and a communication status.

Non-patent Document 1: Erik Nordmark, Marcelo Bagnulo, "Multihoming L3 Shim Approach", draft-ietf-multi6-13shim-00.txt, 10 Jan. 2005.

Non-patent Document 2: J. Arkko, "Failure Detection and Locator Selection in Multi6", draft-ietf-multi6-failure-detection-00.txt, January 2005.

Non-patent Document 3: R. Draves, "Default Address Selection for Internet Protocol version 6 (IPv6)", RFC3484, February 2003.

Non-patent Document 4: Johnson, D. B., Perkins, C. E., and Arkko, J., "Mobility Support in IPv6", RFC3775, June 2004.

However, in a case wherein, when an MN, which belongs to a home network that serves as a site multihoming network provided by a plurality of ISPs and which holds a plurality of HoAs, has moved to a foreign network and transmits a packet to a correspondent node, a phenomenon regarded as a change deterioration, like the stopping of a service due to a failure, a congested state change or a roaming state change between the ISPs has occurred in one of the plurality of ISPs, a packet may not be delivered, or the transmission or reception of a packet may be delayed when the HoA, formed of the prefix of the ISP in the deteriorated state, is selected as an address to be used.

In this case, since the HA of the MN is present in the same home network and a plurality of addresses can be obtained, when the MN that has moved from the home network transmits a encapsulated packet to the HA, an ISP to be passed by the HA is determined in accordance with a destination address that has been designated. Therefore, the MN and HA exchange address information using a multihoming protocol, the purpose of which is that the site multihoming effects provided by the HA are applied for the MN-HA communication, and that the information exchanged by the MN and HA does not include information concerning site multihoming for the home network of the MN.

That is, although an inappropriate ISP or a desirable ISP to be employed for packet transmission is present among a plurality of ISPs that provide, for the home network, the connection to the Internet, the MN is not connected to the home network, so that information related to the status at the home network can not be obtained. For of the above described reason, a problem has arisen, in that since the MN can not determine an HoA that should be designated as a source address in the internal header of an encapsulated packet, the inner packet is transmitted via an inappropriate ISP.

Moreover, since a packet to be transferred by the HA corresponds to the inner packet of the encapsulated packet transmitted by the MN, an ISP through which the transferred packet is passed is determined in accordance with a source address that is designated by the MN based on a specific determination reference. At this time, since generally there are multiple MNs managed by one HA, the HA manages, at the same time, a plurality of MNs that are moving to various other networks. Since the setting of a source address for an inner packet basically depends on determinations made by the individual MNs, it can be said that an HA that manages a plurality of MNs transfers not only a packet that is passed via a specific ISP, but also a packet that is passed via another ISP, without identifying them for each other. Therefore, as a result of a normal packet transfer process, the HA can sequentially obtain the affect had by each ISP on a packet that has been transferred.

On the other hand, while the MN can obtain the status of the ISP that is currently employed as the source address for the inner packet, the MN can not acquire the status of an ISP whose use has been temporarily halted, or the status of an ISP whose presence is not known. Furthermore, in a case wherein the MN includes a plurality of interfaces, which correspond to the respective ISPs, in order to confirm the status of an ISP that has not been employed as the source address for an inner packet, the MN must render a corresponding interface active, transmitting a signal each time, so that power consumption and the volume of traffic are increased. Further, the same situation is applied for a case wherein the individual interfaces included in the MN belong to different home networks provided by different ISPs, and in order to obtain the status of a specific ISP (a home network), a corresponding interface must be rendered active and a signal must be transmitted.

DISCLOSURE OF THE INVENTION

While taking the above described problems into account, one objective of the present invention is to grasp a status available on a home network while an MN is separated from the home network, and to optimize a communication path for a packet to be transmitted between the MN and a CN via an HA.

In order to achieve this objective, a communication control method according to the present invention, for a communication system that includes a mobile node and an address management node, for managing a plurality of home addresses assigned to the mobile node, comprises:

a selection condition information acquisition step of the address management node obtaining selection condition information that is referred to for selection of an appropriate home address it is desirable that the mobile node employs;

a home address selection step of either the mobile node or the address management node employing the selection condition information to select an appropriate home address from among the plurality of home addresses; and a step of the mobile node setting the appropriate home address, selected at the home address selection step, as a source address for an inner packet, of an encapsulated packet, that is to be transmitted to a predetermined correspondent node via the address management node.

According to this arrangement, it is possible to grasp a status available on the home network, while the MN is separated from the home network, and to optimize a communication path for a packet that is to be transmitted between the MN and the CN via the HA.

Further, for the communication control method of this invention, in addition to the above described arrangement, the selection condition information is at least one of: operating state information, indicating an operating state of an ISP to which a site, at which the address management node is present, is currently connected; congestion information, indicating whether congestion has occurred in the ISP; roaming information for the ISP; inner packet transfer destination status information, indicating a transfer destination for the packet; priority information, indicating a priority level for the ISP; QoS path state information, indicating a QoS path state for a communication path in the ISP; delivery status information, indicating a delivery status for the packet relative to a transfer destination; and connection link stability information, indicating whether there is a stable connection link between the address management node and the ISP.

With this arrangement, based on various conditions obtained by the HA, an address can be selected that is to be designated as a source address for the inner packet of an encapsulated packet to be transmitted by the MN to a predetermined correspondent node.

In addition, in order to achieve the above described objective, an address management node according to the present invention, which manages a home address for a mobile node, comprises:

an address management means for managing a plurality of home addresses assigned to the mobile node;

home address selection condition acquisition means for acquiring selection condition information that is referred to for selection of an appropriate home address that it is desirable the mobile node employs;

home address selection means for selecting an appropriate home address from among the plurality of home addresses, based on the selection condition information obtained by the home address selection condition acquisition means; and home address notification means for notifying the mobile node of the appropriate home address selected by the home address selection means.

With this arrangement, the HA can transmit to the MN an appropriate home address, one which it is desirable be used as a source address for the inner packet of an encapsulated packet to be transmitted by the MN.

In addition to the above described arrangement, the address management node of this invention is designed by comprising:

failure detection means for detecting a failure related to a communication by the mobile node, and for determining the need for the mobile node to change the appropriate home address to be set as a source address in a packet that is to be transmitted, wherein, in a case wherein the failure detection means determines that a change in the appropriate home address is required, the home address selection condition acquisition means obtains new selection condition information, the home address selection means newly selects an appropriate home address, and the home address notification means notifies the mobile node of the appropriate home address that has been selected by the home address selection means for a case wherein a change in the appropriate home address is required.

With this arrangement, the HA can change a selected appropriate home address in accordance with a failure related to a communication by the MN.

Further, in addition to the above described arrangement, the address management node of this invention is designed by comprising:

request reception means for receiving, from the mobile node, a request for the appropriate home address, wherein, in a case wherein a request for the appropriate home address is received from the mobile node, the home address notification means notifies the mobile node of the appropriate home address that has been selected by the home address selection means.

With this arrangement, upon receiving a request from the MN, the HA can transmit a notification containing an appropriate home address.

Moreover, in addition to the above described arrangement, the address management node of this invention is designed by comprising:

preference information acquisition means for receiving preference information from the mobile node, wherein the home address selection means selects an appropriate home address that is also based on the preference information.

With this arrangement, also in accordance with preference information obtained by the MN, the HA can change an appropriate home address that has been selected.

Furthermore, in order to achieve the above described objective, an address management node according to the present invention, which manages a home address for a mobile node, comprises:

address management means for managing a plurality of home addresses assigned to the mobile node;

home address selection condition acquisition means for acquiring a selection condition that is to be referred to for selection of an appropriate home address that it is desirable the mobile node employs; and selection condition information notification means for notifying the mobile node of the selection condition information that has been obtained by the home address selection condition acquisition means.

With this arrangement, the HA can notify the MN of selection condition information obtained for an appropriate home address that it is desirable be employed as a source address for the inner packet of an encapsulated packet to be transmitted by the MN.

Further, in addition to the above described arrangement, the address management node of this invention is designed by comprising:

failure detection means for detecting a failure that affects a setup for the appropriate home address and that is related to a communication by the mobile node, wherein the home address selection condition acquisition means acquires new selection condition information that is generated due to the failure, detected by the failure detection means, that is related to a communication by the mobile node, and wherein the selection condition information notification means notifies the mobile node of the selection condition information obtained by the home address selection condition acquisition means.

With this arrangement, the HA can notify the MN of the selection condition information generated due to a failure that is related to a communication by the MN.

In addition, in order to achieve the above described objective, a mobile node according to the present invention, to which a plurality of home addresses are assigned by an address management node, comprises:

home address reception means for receiving, from the address management node, an appropriate home address that it is desirable the mobile node employs; and source address setup means for setting the appropriate home address as a source address for an inner packet included in an encapsulated packet that is to be transmitted, to a predetermined correspondent node, via the address management node.

With this arrangement, the MN can obtain, from the HA, an appropriate home address that it is desirable be employed as a source address for the inner packet of an encapsulated packet to be transmitted by the MN.

Moreover, in addition to the above arrangement, the mobile node of this invention comprises:

request transmission means for transmitting, to the address management node, a request for the appropriate home address.

With this arrangement, the MN can request of the HA a notification containing an appropriate home address.

Furthermore, in addition to the above described arrangement, the mobile node of this invention comprises:

preference information transmission means for transmitting preference information to the address management node.

With this arrangement, the MN can transmit, to the HA, preference information obtained by the MN.

Further, in addition to the above described arrangement, the mobile node of this invention, to which a plurality of home addresses are assigned by an address management node, comprises:

home address selection condition reception means for obtaining selection condition information to be referred to for selection of an appropriate home address it is desirable that the mobile node employs;

home address selection means for selecting the appropriate home address from among the plurality of home addresses based on the selection condition information received by the home address selection reception means; and source address setup means for setting the appropriate home address as a source address for an inner packet included in an encapsulated packet that is to be transmitted to a predetermined correspondent node via the address management node.

With this arrangement, the MN can obtain, from the HA, selection condition information for an appropriate home address that it is desirable be employed as a source address for the inner packet of an encapsulated packet to be transmitted by the MN.

The present invention provides effects such that, while the MN is separated from a home network, a status available on the home network can be obtained, and a communication path for a packet to be transmitted between the MN and the CN via the HA can be optimized.

BRIEF DESCRIPTION OF THE DRAWINGS

[FIG. 4A] A diagram illustrating a first example for an information storage table held by the multihoming information holding unit of the MN according to the first embodiment of the invention.

[FIG. 4B] A diagram illustrating a second example for the information storage table held by the multihoming information holding unit of the MN according to the first embodiment of the invention.

[FIG. 7] A diagram illustrating an example structure for MN management information held by the MN management information holding unit of the HA according to the first embodiment of the invention.

BEST EMBODIMENTS FOR CARRYING OUT THE INVENTION

Figure 1:
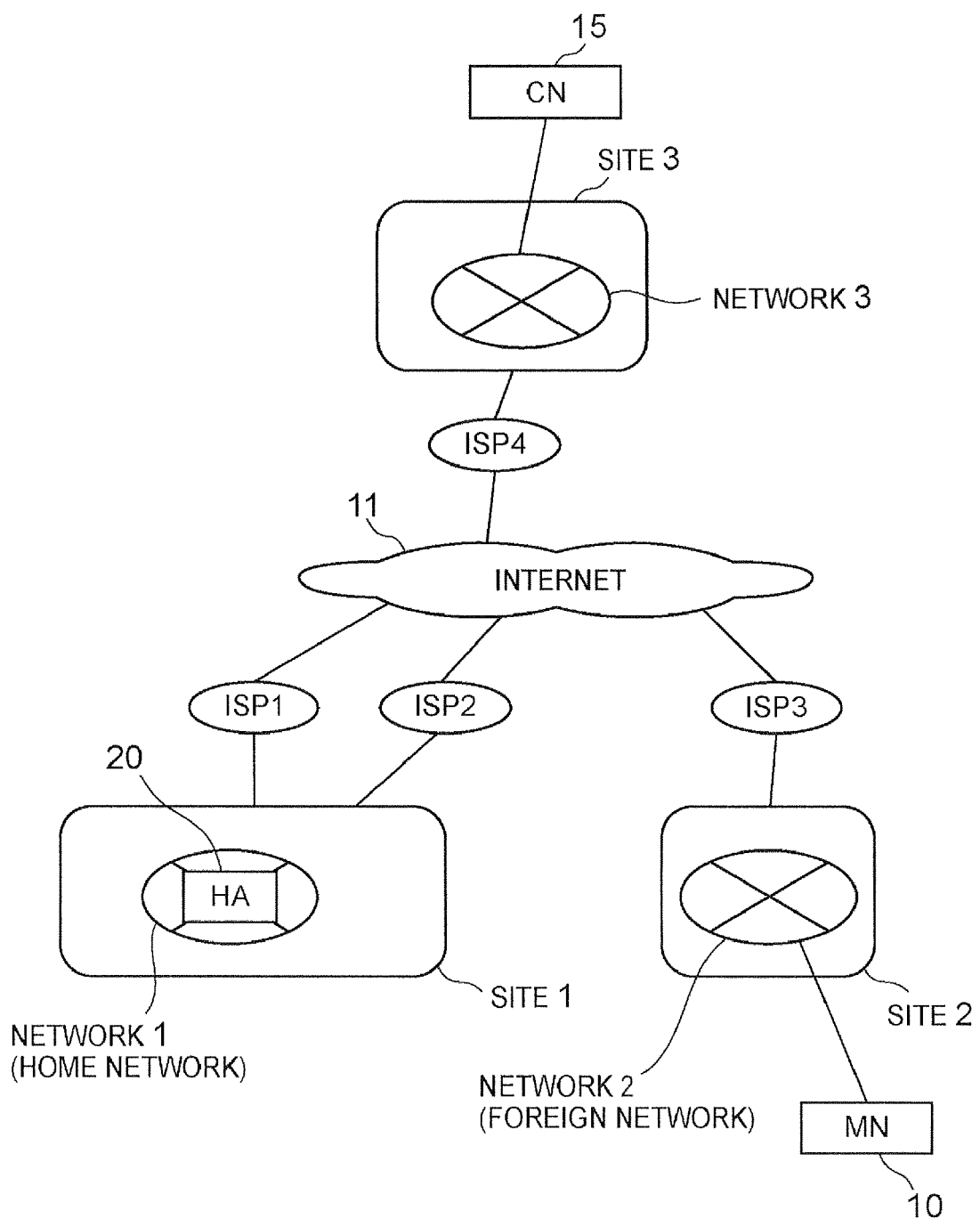
[FIG. 1] A diagram illustrating an example network configuration employed in common for first to third embodiments of the present invention.

First to third embodiments of the present invention will now be described while referring to the drawings. First, a network configuration used in common for the first to the third embodiments of the present invention will be described while referring to FIG. 1. FIG. 1 is a diagram showing an example network configuration used in common for the first to the third embodiments of the present invention.

In FIG. 1, the Internet 11, which is an IP network, four ISPs (Internet Service Providers) connecting the Internet 11 to a site, and three sites connected to the Internet 11 via these ISPs are shown. It should be noted that the four ISPs are denoted by an ISP1, an ISP2, an ISP3 and an ISP4, and that the three sites are denoted by a site 1, a site 2 and a site 3, in order that they may identify each other.

Relative to the Internet 11, the site 1 is connected via the ISP1 and the ISP2, the site 2 is connected via the ISP3, and the site 3 is connected via the ISP4. Further, a network 1 belongs to the site 1, a network 2 belongs to the site 2 and a network 3 belongs to the site 3.

Further, an MN (Mobile Node) 10 that can be connected to one of these networks 1 to 3 and a CN (Correspondent node) 15 that is connected to the network 3 are shown in FIG. 1.

Furthermore, an HA (Home Agent) 20 is present on the network 1. In addition, the MN 10 is a movable node that employs the network 1 as a home network and is managed by the HA 20. That is, the network 1 functions as a home network for the MN 10 that is managed by the HA 20. Hereinafter, in order mainly to explain the MN 10, the network 1 may be called a home network, and the network 2, to which the MN 10 that has been moved is connected, may be called a foreign network.

As shown in FIG. 1, the site 1 is connected to the Internet 11 through the two ISPs, i.e., the ISP1 and the ISP2, and provides a so-called multihomed site. Prefixes transmitted by both the ISP1 and the ISP2 can be employed on the network that belongs to the site 1, and the MN 10 can hold a plurality of HoAs (Home addresses) formed of these prefixes.

It should be noted that, hereinafter, the prefixes reported respectively by the ISP1 to the ISP4 are represented using symbols PF with the number of an ISP added. That is, a prefix transmitted by the ISP1 is represented as a PF1, a prefix transmitted by the ISP1 is represented as a PF2, a prefix transmitted by the ISP3 is represented as a PF3, and a prefix used by the ISP4 is represented as a PF4.

Further, the addresses held by the MN 10 are represented by a combination symbol PF with the number of an ISP added and an HoA or a CoA, in order to clearly indicate whether an HoA or a CoA was employed for the prefix of an address held by the MN 10, and its address. That is, for example, the HoA formed by a prefix transmitted by the site 1 is represented by PF1.HoA. It should be noted that the MN 10 shown in FIG. 1 holds two HoAs (PF1.HoA and PF2.HoA), formed by prefixes that are transmitted by the ISP1 and the ISP2. Further, the address of the CN 15 is indicated as PF4.CN.

The first to the third embodiments of the present invention will now be described, while assuming a case exists wherein the MN 10 communicates the CN 15 via the HA 20, while the MN 10 is connected to a foreign network in the network configuration in FIG. 1. Therefore, in this case, a packet to be transmitted by the MN 10 to the CN 15 is an encapsulated packet, addressed to the HA 20, that includes a packet addressed to the CN 15 as an inner packet.

First Embodiment

Figure 2:
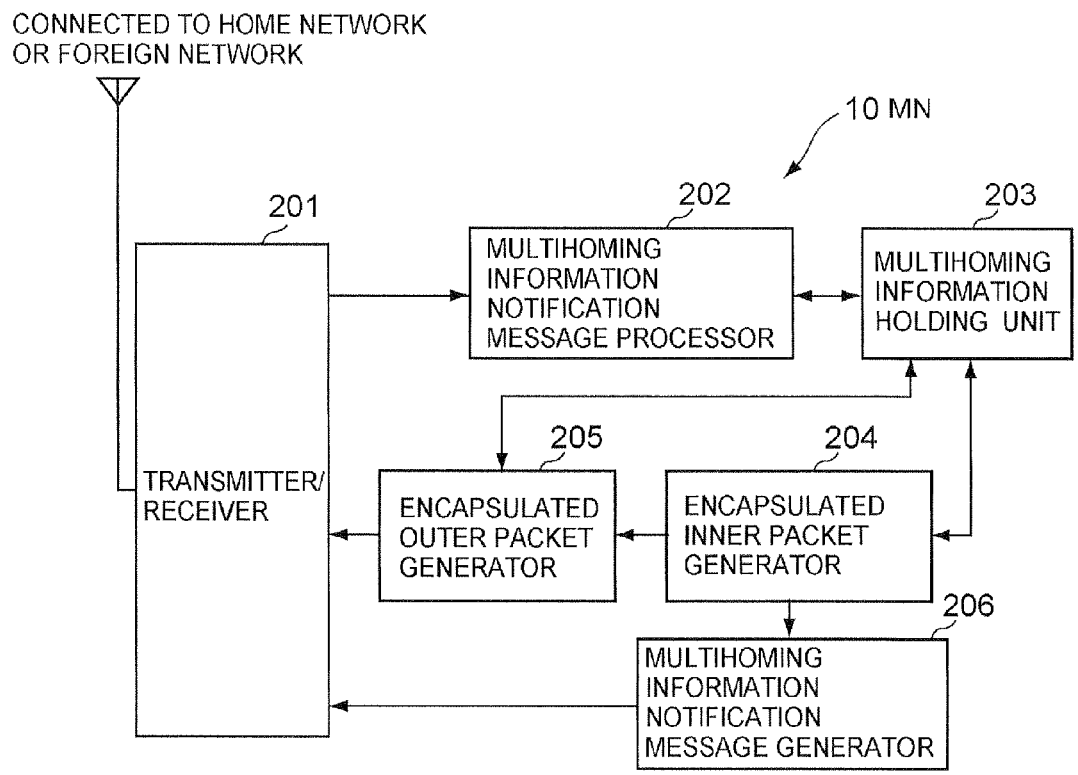
[FIG. 2] A block diagram illustrating an example configuration for an MN according to the first embodiment of the present invention.

First, the first embodiment of the present invention will be described. FIG. 2 is a block diagram illustrating an example arrangement of an MN according to the first embodiment of the present invention. It should be noted that an MN 10 shown in FIG. 2 corresponds to the MN 10 in FIG. 1. The MN 10 in FIG. 2 includes: a transmitter/receiver 21, a multihoming information notification message processor 202, a multihoming information holding unit 203, an encapsulated inner packet generator 204, an encapsulated outer packet generator 205 and a multihoming information notification message generator 206. Also, referring now to FIG. 2, the functions performed by the MN 10 are shown by using blocks; these functions can also be provided using hardware or software.

The transmitter/receiver 201 is a function that accesses a network (e.g., a home network or a foreign network for the MN 10), through wireless communication, to communicate with an arbitrary node present in that network and another arbitrary node that is connected to another network via the ISP.

Further, the multihoming information notification message processor 202 is a function that performs a process related to a multihoming information notification message (see FIG. 3) received from the HA 20.

Figure 3:
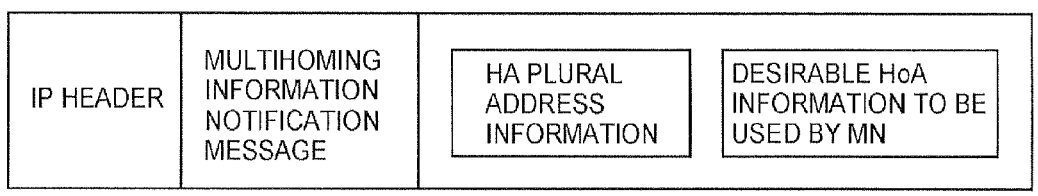
[FIG. 3] A diagram illustrating an example structure for a multihoming information notification message used to transmit desirable HoA information to be employed by the MN according to the first embodiment of the invention.

FIG. 3 is a diagram showing an example structure for a multihoming information notification message, according to the first embodiment of the invention, for transmitting desirable HoA information that is to be employed by the MN. As shown in FIG. 3, the multihoming information notification message to be transmitted by the HA 20 to the MN 10 includes: an IP header; information (e.g., a flag) indicating that this message is a multihoming information notification message; a field (HA plural address information field) for inserting plural address information for the HA 20; and a field (an appropriate HoA information field) for inserting desirable HoA information (proper HoA information) to be used by the MN 10.

The appropriate HoA information field of the multihoming information notification message includes desirable HoA information selected by the HA 20 so as to be used by the MN 10. When the multihoming information notification message processor 202 obtains HoA information, the multihoming information notification message processor 202 supplies the HoA information to the multihoming information holding unit 203 and also issues an instruction to hold the HoA information.

Furthermore, in a case wherein the HA 20 has held a plurality of addresses using site multihoming, the HA 20 can also include, in the HA plural address information field of the multihoming information notification message, information related to the addresses held by the HA 20. In this case, the multihoming information notification message processor 202 can supply, as well as the HoA information, information related to a plurality of addresses to the multihoming information holding unit 203, and can issue an instruction to hold the information.

Further, the multihoming information holding unit 203 is a function that holds desirable HoA information transmitted by the multihoming notification message processor 202 so as to be used by the MN 10, and other received information. An example information storage table held by the multihoming information holding unit 203 is shown in FIGS. 4A and 4B.

FIGS. 4A and 4B are diagrams showing an example information storage table held by the multihoming holding unit of the MN according to the first embodiment of the invention. In an information storage table held by the multihoming information holding unit 203, multihoming information, such as plural address information transmitted by the HA 20 and the other node (e.g., the CN 15), is managed for each source node of a notification message (e.g., an HA or another node). It should be noted that an address and other identification information (ID) can be employed as information for specifying a node.

In FIG. 4A, an example entry related to the HA 20 is shown for the information storage table held by the multihoming information holding unit 203. As described above, desirable HoA information to be used by the MN 10 and plural address information for the HA 20 (an HA address A, an HA address B, . . . in FIG. 4A), all of which are supplied by the multihoming information notification message processor 202, are held in this entry, in correlation with the IP address/ID of the HA 20.

On the other hand, in FIG. 4B, an example entry related to the CN 15 is shown for the information storage table held by the multihoming information holder unit 203. As described above, the plural address information (a CN address A, a CN address B, . . . in FIG. 4B) of the CN 15 is held in this entry, in correlation with the IP address/ID of the CN 15. It should be noted that, since desirable HoA information to be used by the MN 10 is not transmitted by the CN 15, desirable HoA information to be used by the MN 10 is not especially held.

Further, the encapsulated inner packet generator 204 is a function that generates a packet to be transmitted by the MN 10 to a correspondent node, such as the HA 20 or the CN 15. It should be noted that, for a normal communication with the CN 15, data to be transmitted to the CN 15 (data included in a packet) is, for example, supplied from a higher layer (not shown). When a source address for a packet to be inserted is to be set, the encapsulated inner packet generator 204 refers to desirable HoA information held by the multihoming information holding unit 203 so as to be employed by the MN 10, and generates a packet, for which the HoA is set as a source address. For a case of the transmission of a packet to a node (e.g., the CN 15) other than the HA 20, the encapsulated inner packet generator 204 generates the inner packet for an encapsulated packet.

Furthermore, when the multihoming information holding unit 203 is examined to generate an inner packet, and in a case wherein desirable HoA information to be used by the MN 10 is not included, the encapsulated inner packet generator 204 issues an instruction to the multihoming information notification message generator 206 to generate a multihoming information notification message to request desirable HoA information for use by the MN 10.

In addition, the encapsulated outer packet generator 205 has a function for generating an encapsulated packet (outer packet) addressed to the HA 20 of the encapsulated outer packet generator 205, in a case wherein a packet generated by the encapsulated inner packet generator 204 is addressed to a node (e.g., the CN 15) other than the HA 20. In addition, in a case wherein plural address information for the HA 20 is included in information held by the multihoming information holding unit 203, the encapsulated outer packet generator 205 selects, as needed, the address of the HA 20 that is to be designated as an destination address for the outer packet. In a case wherein plural address information for the HA 20 is held in the multihoming information holding unit 203 and the MN 10 does not need to select an address from it, the encapsulated outer packet generator 205 generates an outer packet without referring to the multihoming information holding unit 203.

Moreover, the multihoming information notification message generator 206 is a function that, in a case wherein an instruction is received from the encapsulated inner packet generator 204 or at an arbitrary timing, generates a multihoming information notification message (see FIG. 5) that includes information for instructing the request of desirable HoA information to be used by the MN 10, and transmits this message to the HA 20 via the transmitter/receiver 201.

Figure 5:
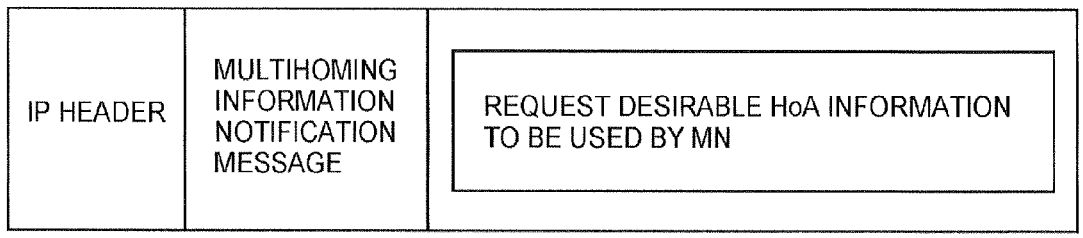
[FIG. 5] A diagram illustrating an example structure for a multihoming information notification message used to request desirable HoA information to be employed by the MN according to the first embodiment of the invention.

FIG. 5 is a diagram showing an example structure for a multihoming information notification message, according to the first embodiment of the invention, that requests desirable HoA information to be used by the MN 10. A multihoming information notification message to be transmitted by the MN 10 to the HA 20 includes: an IP header; information (e.g., a flag) indicating that this message is a multihoming information notification message; and information for requesting desirable information to be used by the MN 10.

As described above, the MN 10 shown in FIG. 2 can obtain, from the HA 20, for the MN 10, information related to a desirable HoA that is to be used as a source address for an inner packet. It should be noted that various functions provided by an MN of the first embodiment of the invention can be performed according to a protocol, such as a mobile IP supplied with the MN, and can also be performed by a special layer that provides multihoming.

Figure 6:
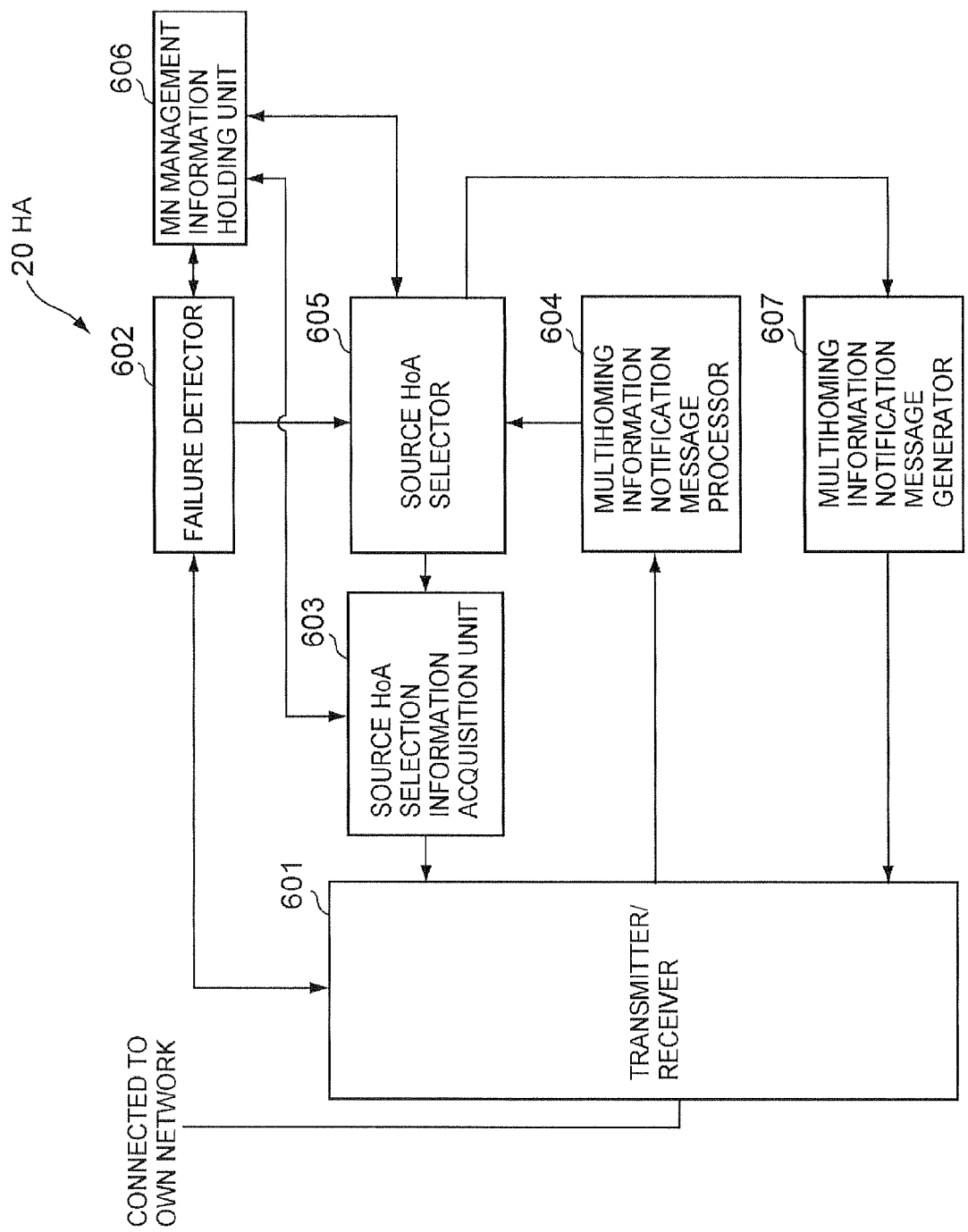
[FIG. 6] A block diagram illustrating an example arrangement for an HA according to the first embodiment of the invention.

FIG. 6 is a block diagram showing an example arrangement for an HA according to the first embodiment of the invention. The HA 20 shown in FIG. 6 includes: a transmitter/receiver 601, a failure detector 602, a source HoA selection information acquisition unit 603, a multihoming information notification message processor 604, a source HoA selector 605, an MN management information holding unit 606, and a multihoming information notification message generator 607. Further, in FIG. 6, the functions performed in the HA 20 are represented using blocks; these functions can also be provided using hardware or software.

The transmitter/receiver 601 is a function that communicates with an arbitrary node in the network 1 for the transmitter/receiver 601, or that is connected to a different network (e.g., the network 2 or the network 3), via an ISP, for communicating with another node that is connected to the different network.

Further, the failure detector 602 is a function that detects a failure that adversely affects communication, and determines whether a source address (a source address for the inner packet of the MN 10) should be changed. In a case wherein it is determined that the source address should be changed, the failure detector 602 issues an instruction to the source HoA selector 605 to select a new address to be used. It should be noted that a method described in non-patent document can be employed as a reference for determining that the source address should be changed; however, the method is not limited to this, and an arbitrary reference may also be employed for a determination.

Furthermore, the source HoA selection information acquisition unit 603 is a function that, in a case wherein an instruction is received from the source HoA selector 605, or at an arbitrary timing, obtains useful information through the transmitter/receiver 601 in order to select a desirable HoA to be used by the MN 10, and issues an instruction to the MN management information holding unit 606 to store this information (or, newly obtained information or information to be updated).

Useful information (a condition for selecting a desirable HoA to be used by the MN 10), which is obtained by the source HoA selection information acquisition unit 603 in order to select an HoA, can be, for example, information (ISP operating state information) indicating whether each ISP is operating, information (ISP congestion information) for the presence/absence of congestion for each ISP, or indicating the level of the congestion, inter-ISP roaming information, (ISP roaming information) information concerning roaming between the individual ISPs and the HA 20 and between the MN 10 and the network, information (inner packet transfer destination status information) indicating the status of the transfer destination of an inner packet, information (ISP priority information) indicating the priority of an ISP, information (QoS path state information) indicating the QoS path state of a communication path in each ISP, a delivery status for a transfer packet, and stability of a connection link for the HA to the ISP.

Also, the multihoming information notification message processor 604 is a function that performs a process related to a multihoming information notification message (see FIG. 5), received from the MN 10, that includes information indicating a request for desirable HoA information to be used by the MN 10, and that issues an instruction to the source HoA selector 605 to select a desirable HoA to be used by the MN 10.

Moreover, the source HoA selector 605 has a function that, in a case wherein, when an instruction is received from the failure detector 602 or the multihoming information notification message processor 604, useful information for selecting a source HoA is stored in the MN management information holding unit 606, obtains this information and selects an appropriate HoA using this information, and issues an instruction to the multihoming information notification message generator 607 to generate a multihoming information notification message for notifying the MN 10 of the selected HoA information.

Furthermore, the source HoA selector 605 has a function that, in a case wherein useful information for selecting a source HoA is not stored in the MN management information holding unit 606, issues an instruction to the source HoA selection information acquisition unit 603 to obtain necessary information, selects an appropriate HoA using the information obtained by the source HoA selection information acquisition unit 603, and issues an instruction to the multihoming information notification message generator 607 to generate a multihoming information notification message for notifying the MN 10 of the selected HoA information.

It should be noted that, instead of upon receiving an instruction from the multihoming information notification message processor 604, the source HoA selector 605 may select an HoA automatically (i.e., voluntarily, without being requested by the MN 10) at a timing whereat the source HoA selection information acquisition unit 603 detects a status change, and whereat the MN management information in the MN management information holding unit 606 is updated. And the source HoA selector 605 may notify the MN 10 of the selected HoA through the multihoming information notification message generator 607. Further, so long as an HoA used by a MN can be identified, any information can be employed as HoA information selected and transmitted using a multihoming information notification message. For example, information may be an HoA, a prefix for this HoA, or information indicating an ISP that transmits this prefix.

A method described in non-patent document 2 or 3, etc., can be employed to select a source HoA. However, the method is not limited to these, and arbitrary information and an arbitrary method can be employed. Example useful information for selecting a source HoA can be the above described information (ISP operating state information, ISP congestion information, ISP roaming information, inner packet transfer destination status information, ISP priority information, QoS path state information, transfer packet delivery status information, stability information for a connection link of an HA to an ISP, etc.). These sets of information may be formed based on information that is obtained through an affect produced by the inner packet of a packet that was received from the MN by the HA, decapsulated and transferred.

For example, the source HoA selector 605 can examine the ISP operating state information included in the MN management information stored in the MN management information holding unit 606, and determine whether or not an ISP is operating, and can select an HoA that belongs to the ISP whose operation is confirmed, and notify the MN 10 of the selected HoA.

Assuming that, as a source HoA for an inner packet, the MN 10 has selected an HoA that belongs to an ISP that is inactive, delivery of this packet is disabled. However, when the HA 20 verifies the operating state, and notifies the MN 10 of an HoA that belongs to an ISP whose operation is confirmed, selection of an HoA that belongs to an inactive ISP can be prevented for the MN 10, and since the MN 10 can select an HoA that belongs to an ISP currently operated, disabling of packet delivery can be prevented.

Further, for example, the source HoA selector 605 can examine, for each ISP, the congestion state and the level of congestion by referring to the ISP congestion information that is included in the MN management information stored in the MN management information holding unit 606, can select an HoA that belongs to an ISP where no congestion occurs, or an ISP in the least strong congestion state, and can notify the MN 10 of the selected HoA. It should be noted that ISP congestion information held by the MN management information holding unit 606 can be obtained by an affect, imposed on the inner packet of a packet that is received by the MN, decapsulated and transferred.

Assuming that as a source HoA for an inner packet the MN 10 has selected an HoA that belongs to an ISP having a high congestion level, there is a probability that this packet will become a packet loss or that a delay will occur in the packet. However, when the HA 20 verifies the congestion state, and notifies the MN 10 of an HoA that belongs to an ISP wherein no congestion has occurred, or an ISP in the weakest congestion state, the selection of an HoA that belongs to an inactive ISP is prevented for the MN 10, and since an HoA that belongs to an ISP where no congestion has occurred, or an ISP in the weakest congestion state, can be selected, congestion control that prevents a packet loss or a delay can be performed.

Further, for example, the source HoA selector 605 can compare the individual roaming states by referring to the ISP roaming information that is included in the MN management information stored in the MN management information holding unit 606, and can select the HoA of the most useful ISP for the MN 10 or the CN 15, or for the home network and the HA 20, and notify the MN 10 of the selected HoA. It should be noted that not only roaming information concerning the MN, but also roaming information concerning the HA may be employed. Furthermore, the contract information of the MN or the HA relative to each ISP may be referred to or compared to select the HoA that belongs to the most useful ISP.

Furthermore, for example, the source HoA selector 605 obtains the status of the transfer destination for an inner packet by referring to the inner packet transfer destination status information, which is included in the MN management information stored in the MN management information holding unit 606, and selects an HoA in order to distribute a load imposed on the transfer destination of the inner packet of an encapsulated packet that is received from the MN 10, so that the selected HoA can be transmitted to the MN 10. Through this distributed control, the ISPs employed by the individual MNs 10 can be distributed and the processing load imposed on the ISPs averaged, and as a result, congestion control is imposed, i.e., packet loss and delay are reduced.

In addition, for example, the source HoA selector 605 can refer to ISP priority information, which is included in the MN management information stored in the MN management information holding unit 606 and which can select an HoA that belongs to the ISP having a high priority, and notify the MN 10 of the selected HoA. It should be noted that instead of the priority of the ISP, priority information (dynamically and/or statically allocated by a user or an operator) allocated to an address may be employed.

Moreover, for example, the source selector 605 can refer to the QoS path state information, which is included in the MN management information stored in the MN management information holding unit 606, and compare the QoS state for the communication path in each ISP, and can select an HoA that belongs to the ISP where a QoS path, in a more superior state, is formed, and notify the MN 10 of the selected HoA.

Also, for example, the source HoA selector 605 can refer to the transfer packet delivery status information, which is included in the MN management information stored in the MN management information holding unit 606, and compare the delivery statuses where packets were transferred to the destinations using the individual ISPs, and can select an HoA that belongs to an ISP having a higher delivery rate, and notify the MN 10 of the selected HoA. A method for obtaining the delivery status is, for example, a method for examining whether an ICMP (Internet Control and Management Protocol) Destination Unreachable Message was returned to a packet that was transferred. Since this message indicates that it has been determined that this packet can not be transferred any farther by a router on a transfer path, it is assumed that a failure has occurred on an ISP having a high reception rate for this message.

Further, for example, the source HoA selector 605 can refer to stability information for a connection link to the ISP of the HA and compare the state of the HA link connected to the ISP, and can select an HoA that belongs to an ISP to which a link, in a more superior state, is connected and notify the MN 10 of the selected HoA.

It should be noted that the source HoA selector 605 can also select the optimal HoA by employing, at the same time, various arbitrary types of information included in the MN management information stored in the MN management information holding unit 606 described above.

Furthermore, the MN management information holding unit 606 is a function that holds information (information in the MN management information shown in FIG. 7) to be examined by the source HoA selector 605 in order to select a desirable HoA to be used by the MN 10. It should be noted that useful information, which is held by the MN management information holding unit 606 in the above described manner, for selecting a desirable HoA to be employed by the MN 10, is referred to when the source HoA selector 605 selects a desirable HoA to be used by the MN 10.

FIG. 7 is a diagram showing an example structure for the MN management information held by the MN management information holding unit of the HA according to the first embodiment of the invention. As shown in FIG. 7, for the MN management information, entries are prepared for the individual MNs 10 managed by the HA 20 in order to hold information that is useful for the selection of a desirable HoA to be used by the MN 10.

As shown in FIG. 7, various of the above described information that is useful for selecting a desirable HoA to be used by the MN 10, such as the ISP operating state information, the ISP congestion information, the ISP roaming information, the inner packet transfer destination status information, the ISP priority information, the QoS path status information, the transfer packet delivery status information (not shown) and the stability information for the connection link of the HA to the ISP (not shown), can be stored in the entries made for the MN management information that is correlated with the IP address/ID of each MN 10 that is managed by the HA 20. It should be noted that in the MN management information, information obtained by the source HoA selection information acquisition unit 603 is included as useful information for the selection of a desirable HoA to be used by the MN 10; however, for example, information manually designated by the operator of the HA 20 may be included.

Further, a binding cache, which is to be used to manage binding information transmitted by the MN 10, may be extended and employed as MN management information that includes useful information for the selection of a desirable HoA to be used by the MN 10.

Furthermore, the multihoming information notification message generator 607 is a function that generates a multihoming information notification message for notifying the MN 10 of an HoA that is selected by the source HoA selector 605 and that transmits the multihoming information notification message to the MN 10 via the transmitter/receiver 601.

It should be noted that the function of the HA in the first embodiment of this invention may be installed in another node, such as an information server, etc.

As described above, while taking various conditions into account, the HA 20 shown in FIG. 6 can select a desirable HoA to be used by the MN 10, and can notify the MN 10 of the selected HoA. It should be noted that various functions provided by the HA for the first embodiment of the invention can be performed using a protocol, such as a mobile IP provided with the HA, and can also be performed by a special layer that provides multihoming.

Next, a specific operation for the first embodiment of the invention will be described. Assume a case wherein the MN 10 is to communicate with the CN 15 when, for example, as shown in FIG. 1, the MN 10 is connected to the foreign network 2. At this time, in a case wherein congestion has occurred, for example, in the ISP 1, the source HoA selection information acquisition unit 603 of the HA 20 detects this fact, and updates the MN management information stored in the MN management information holding unit 606.

And in a case wherein a multihoming information notification message, as shown in FIG. 5, which includes information for instructing that a request for desirable HoA information be used by the MN 10, is received from the MN 10, or at an arbitrary voluntary timing (i.e., in a state wherein no request is received from the MN 10), the HA 20 transmits a multihoming information notification message shown in FIG. 3 to the MN 10, indicating that it is desired that an HoA belonging to the ISP2 be selected. Upon receiving this notification, the MN 10 stores, in the multihoming information holding unit 203, information indicating that the HoA belonging to the ISP2 is appropriate as the source HoA of the inner packet, and when a packet to be transmitted to the CN 15 is to be generated, PF2.HoA is designated as the source address for the inner packet.

Therefore, after the packet transmitted by the MN 10 is decapsulated by the HA 20, the inner packet thereof is delivered to the CN 15 along the optimal path via the ISP2 whose congestion level is relatively low.

As described above, according to the first embodiment of the invention, the MN 10 can obtain, from the HA 20, desirable HoA information that is to be used as a source address for an inner packet. And since the HoA is designated as a source address for an inner packet, after an encapsulated packet transmitted by the MN 10 is decapsulated by the HA 20, the inner packet is transferred by the HA 20 and is delivered to the CN 15 through an ISP that is appropriate for the MN 10. In addition, for the selection of an HoA, instead of permitting the individual MNs to examine the states of the respective ISPs, the HA that is in charge of packet transfer for all the MNs can examine the states of the ISPs, and can determine an HoA to be used by each MN. Therefore, the quantity of signals transmitted by the MNs for examining the ISP state can be reduced, and one-dimensional management of the MNs by the HA can be maintained.

Second Embodiment

Figure 8:
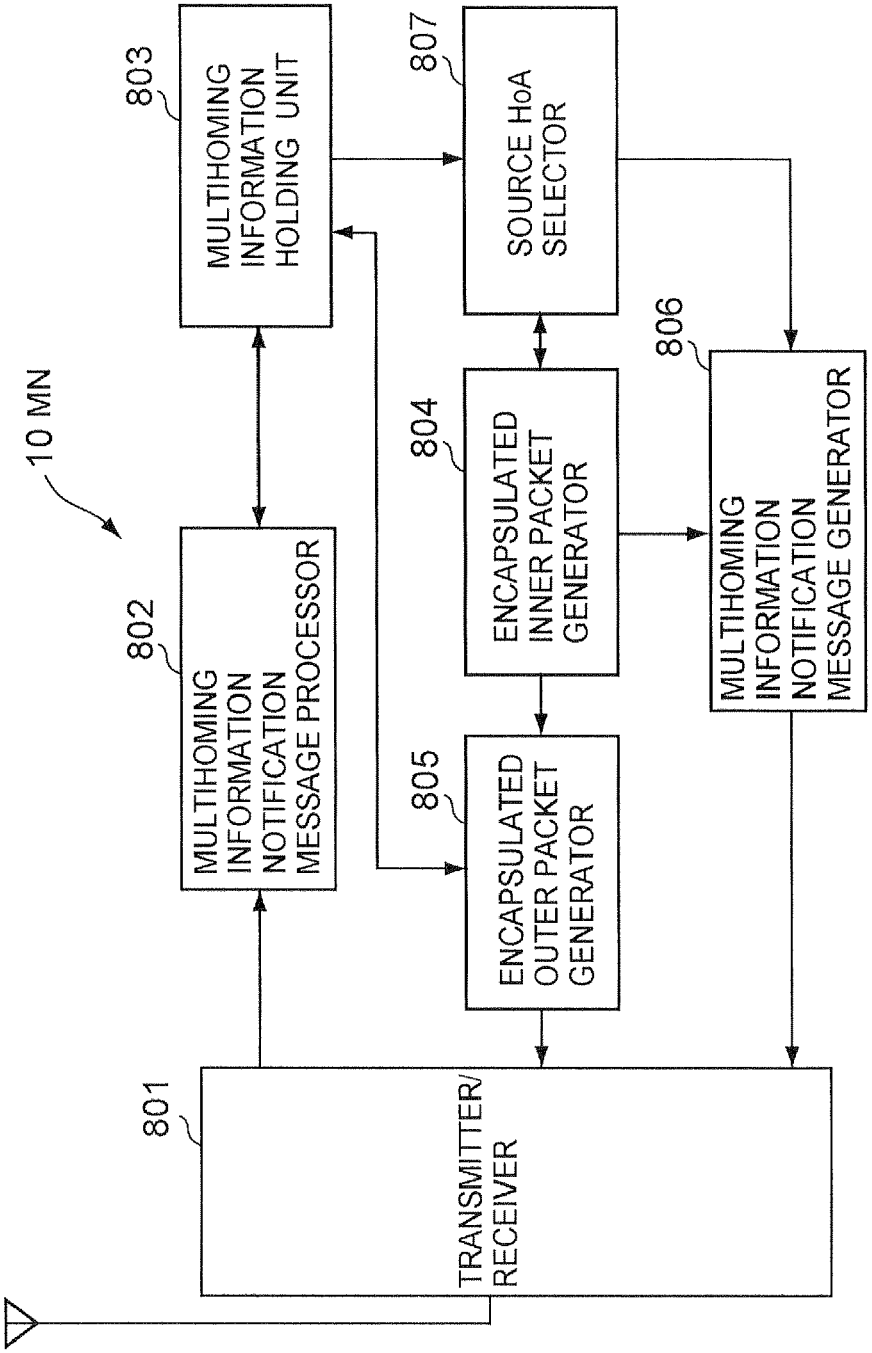
[FIG. 8] A block diagram illustrating an example arrangement for an MN according to a second embodiment of the present invention.

Next, a second embodiment of the present invention will be described. FIG. 8 is a block diagram illustrating an example arrangement for an MN according to the second embodiment of the invention. It should be noted that an MN 10 shown in FIG. 8 corresponds to the MN 10 in FIG. 1. The MN 10 in FIG. 8 includes: a transmitter/receiver 801, a multihoming information notification message processor 802, a multihoming information holding unit 803, an encapsulated inner packet generator 804, an encapsulated outer packet generator 805, a multihoming information notification message generator 806 and a source HoA selector 807. Further, in FIG. 8, the functions performed by the MN 10 are represented using blocks; these functions can also be provided using hardware or software.

The arrangement of the MN 10 for the second embodiment of the invention will now be described by being compared with the arrangement (the arrangement in FIG. 2) of the MN 10 for the first embodiment of the invention. In a case of a comparison with the arrangement of the MN 10 of the first embodiment of the invention, a difference in the arrangement of the MN 10 for the second embodiment of the invention is that information transmitted by an HA 20 is not desirable HoA information to be used by the MN 10, but information useful for the MN 10 to select an appropriate HoA.

Accordingly, the functions of the multihoming information notification message processor 802, the multihoming information holding unit 803, the encapsulated inner packet generator 804 and the multihoming information notification message generator 806 shown in FIG. 8 are different from the functions of the multihoming information notification message processor 202, the multihoming information holding unit 203, the encapsulated inner packet generator 204 and the multihoming information notification message generator 206 in FIG. 2. Furthermore, a source HoA selector 807 is additionally provided for the MN 10 shown in FIG. 8.

It should be noted that the same information as described in the first embodiment of the invention can be employed as information useful for selecting an appropriate HoA. Further, since the transmitter/receiver 801 and the encapsulated outer packet generator 805 of the MN 10 in FIG. 8 are the same as the transmitter/receiver 201 and the encapsulated outer packet generator 205 of the MN 10 of the MN 10 in FIG. 2, no further explanation for them will be given.

The multihoming information notification message processor 802 is a function that performs a process related to a multihoming information notification message (see FIG. 9) received from the HA 20.

Figure 9:
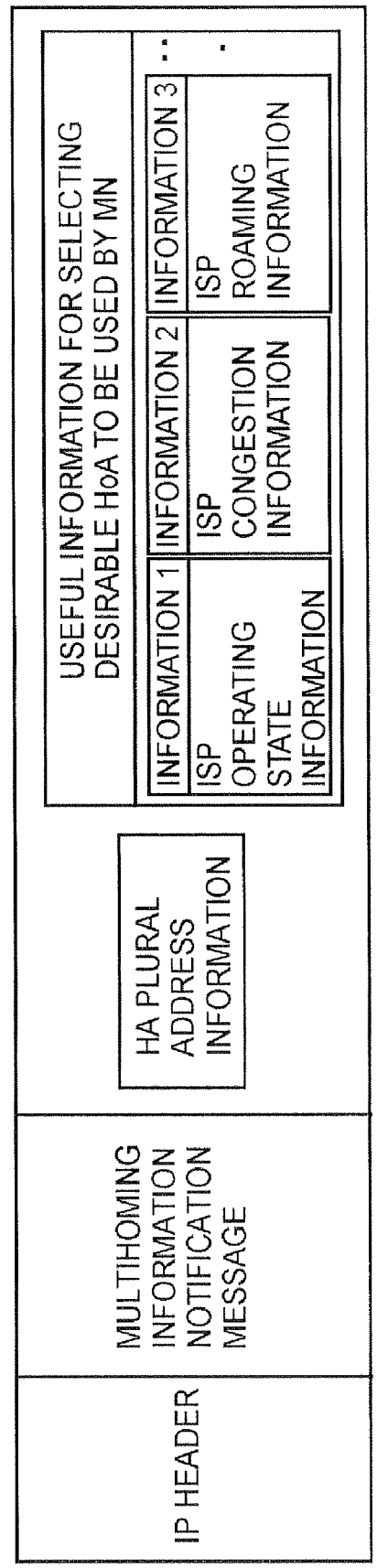
[FIG. 9] A diagram illustrating an example structure for a multihoming information notification message used to transmit effective information for the selection of a desirable HoA to be employed by the MN according to the second embodiment of the present invention.

FIG. 9 is a diagram showing an example structure for a multihoming information notification message, for the second embodiment of the invention, for transmitting information that is useful for selecting a desirable HoA to be used by the MN. As shown in FIG. 9, the multihoming information notification message to be transmitted by the HA 20 to the MN 10 includes: an IP header; a field (HA plural address information field) for inserting not only information (e.g., a flag) indicating that this message is a multihoming information notification message, but also plural address information for the HA 20; and a field (selection condition information field) for inserting information that is useful for selecting a desirable HoA to be used by the MN 10.

The selection condition information field of the multihoming information notification message includes information that is useful for selecting a desirable HoA to be used by the MN 10. It should be noted that information that is useful for selecting a desirable HoA to be used by the MN 10 is the same as information present in the entry (see FIG. 7) of the MN management information that is held by the MN management information holding unit 606 of the HA 20 in the above described first embodiment of the invention. Further, a case wherein ISP operating state information, ISP congestion information and ISP roaming information are included in the selection condition information field is shown in FIG. 9. In addition, inner packet transfer destination status information, ISP priority information, QoS path state information, transfer packet delivery status information, stability information for the connection link of the HA relative to an ISP, and other information that is useful for selecting a desirable HoA to be used by the MN 10 may be included in FIG. 9.

The multihoming information notification message processor 802 obtains information that is useful for selecting a desirable HoA to be used by the MN 10, supplies this information to the multihoming information holding unit 803, and issues an instruction to hold this information.

As well as in the first embodiment of the invention, the HA 20 can include information related to multiple addresses held by the HA 20 in the HA plural address information field of the multihoming information notification message. In this case, the multihoming information notification message processor 802 can supply, to the multihoming information holding unit 803, the information related to multiple addresses, as well as the HoA information, and can issue an instruction to store this information. Further, information related to multiple addresses held by the HA may include information that MN refers to when selecting one of a plurality of HA addresses to use. The MN that has obtained this information can refer to this information and select an HA address to use, so that the destination address of the external header of an encapsulated packet is designated.

In addition, the multihoming information holding unit 803 is a function that holds information that is received from the multihoming information notification message processor 802 and that is useful for selecting a desirable HoA to be used by the MN 10, and other received information (e.g., information related to a plurality of addresses for the HA 20 and preference information that will be described later). An example information storage table held by the multihoming information holding unit 803 is shown in FIGS. 10A and 10B.

Figure 10A:
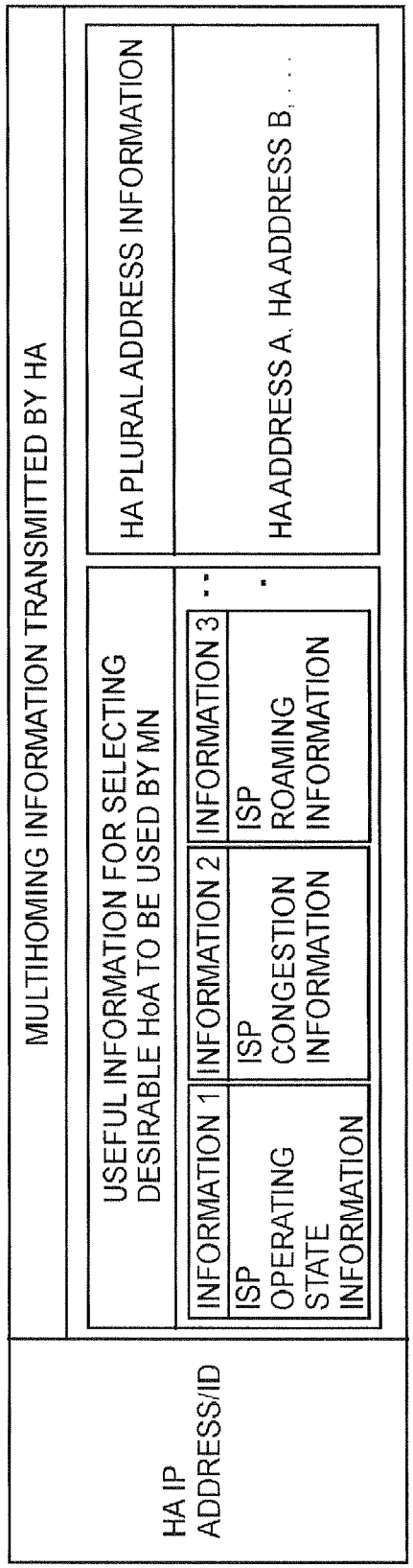
[FIG. 10A] A diagram illustrating a first example for an information storage table held by the multihoming information holding unit of the MN according to the second embodiment of the invention.
Figure 10B:
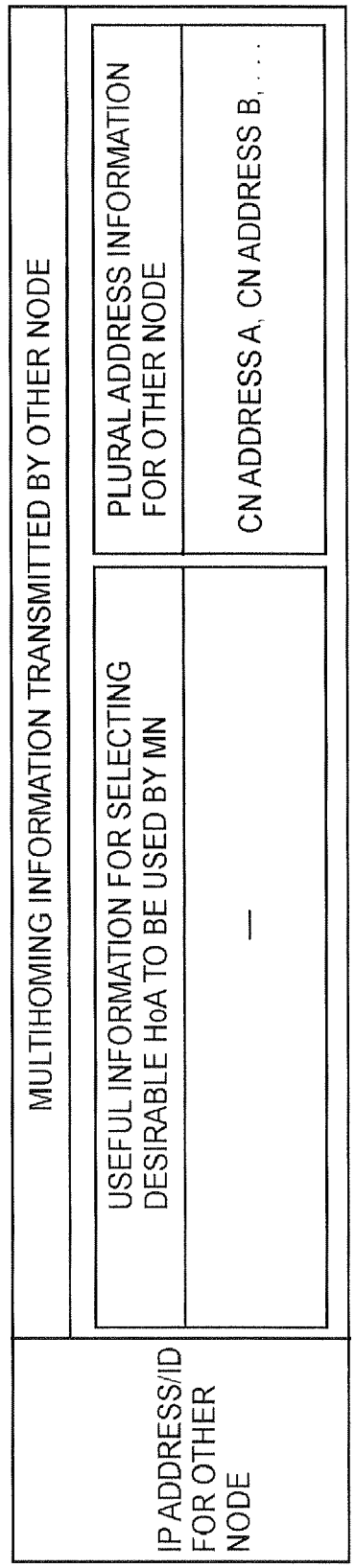
[FIG. 10B] A diagram illustrating a second example for the information storage table held by the multihoming information holding unit of the MN according to the second embodiment of the invention.

FIGS. 10A and 10B are diagrams showing an example information storage table held by the multihoming information holding unit of the MN according to the second embodiment of the invention. In the information storage table held by the multihoming information holding unit 803, multihoming information, such as plural address information, transmitted by the HA 20 and the other node (e.g., the CN 15), is managed for the individual source nodes (e.g., the HA and the other node) of notification messages. It should be noted that an address and other identification information (ID) can be employed as information for specifying a node.

In FIG. 10A, an example entry related to the HA 20 is shown for the information storage table held by the multihoming information holding unit 803. As described above, information that is supplied by the multihoming information notification message processor 802 and that is useful for selecting a desirable HoA to be used by the MN 10, and plural address information for the HA 20 (HA address A, HA address B, . . . in FIG. 10A) are held in the entry in correlation with the IP address/ID of the HA 20.

On the other hand, in FIG. 10B, an example entry related to the other node (CN 15) is shown for the information storage table held by the multihoming information holding unit 803. As described above, plural address information for the CN 15 (CN address A, CN address B, . . . in FIG. 10B) is held in this entry in correlation with the IP address/ID of the CN 15. It should be noted that since the CN 15 does not transmit information that is useful for selecting a desirable HoA to be used by the MN 10, information that is useful for selecting a desirable HoA to be used by the MN 10 is not especially stored.

Further, the encapsulated inner packet generator 804 is a function that generates a packet the MN 10 transmits to a correspondent node, such as the HA 20 or the CN 15. For setting a source address for a packet, the encapsulated inner packet generator 804 issues an instruction to select desirable HoA information to be used by the MN 10. In a case for the transmission of a packet to a node (e.g., the CN 15) other than the HA 20, the encapsulated inner packet generator 804 generates an inner packet for an encapsulated packet.

Furthermore, the source HoA selector 807 has a function that, in a case wherein information that is useful for selecting a source HoA is present in the multihoming information holding unit 803, obtains this information, selects an appropriate HoA using this information, and notifies the encapsulated inner packet generator 804 of the selected HoA information.

In addition, the source HoA selector 807 has a function that, in a case wherein information that is useful for selecting a source HoA is not stored in the multihoming information holding unit 803, issues an instruction to the multihoming information notification message generator 806 to generate a message (multihoming information notification message) to request from the HA 20 information that is useful for selecting a desirable HoA to be used by the MN 10.

It should be noted that the source HoA selector 807 may select a source HoA by taking into account information held by the multihoming information holding unit 803 and preference information for the MN that is stored in advance by the source HoA selector 807. This preference information is: information that indicates an information type that should be considered most in a case wherein there are a plurality of sets of useful information for selecting a desirable HoA to be used by the MN 10; and more detailed information (information issued upon user requests, such as information that usage of the ISP2 is desired rather than the usage of the ISP1, or information that usage of an inexpensive path is desired, even if a band is not guaranteed). That is, the preference information can be a condition grasped by the MN 10 for selecting a source HoA.

In addition, the multihoming information notification message generator 806 is a function that, upon receiving an instruction from the source HoA selector 807, generates a multihoming information notification message that includes information for instructing a request for information that is useful for selecting a desirable HoA to be used by the MN 10, and transmits this message to the HA 20 via the transmitter/receiver 801.

As described above, the MN 10 shown in FIG. 8 can obtain, from the HA 20 for the MN 10, information that is useful for selecting a desirable HoA to be used as a source address for an inner packet, and can employ this information (and the preference information held by the MN 10) to select an HoA. It should be noted that various functions provided by the MN for the second embodiment of the invention can be performed using a protocol, such as a mobile IP, supplied with the MN, and can also be performed by a special layer that provides multihoming.

Figure 11:
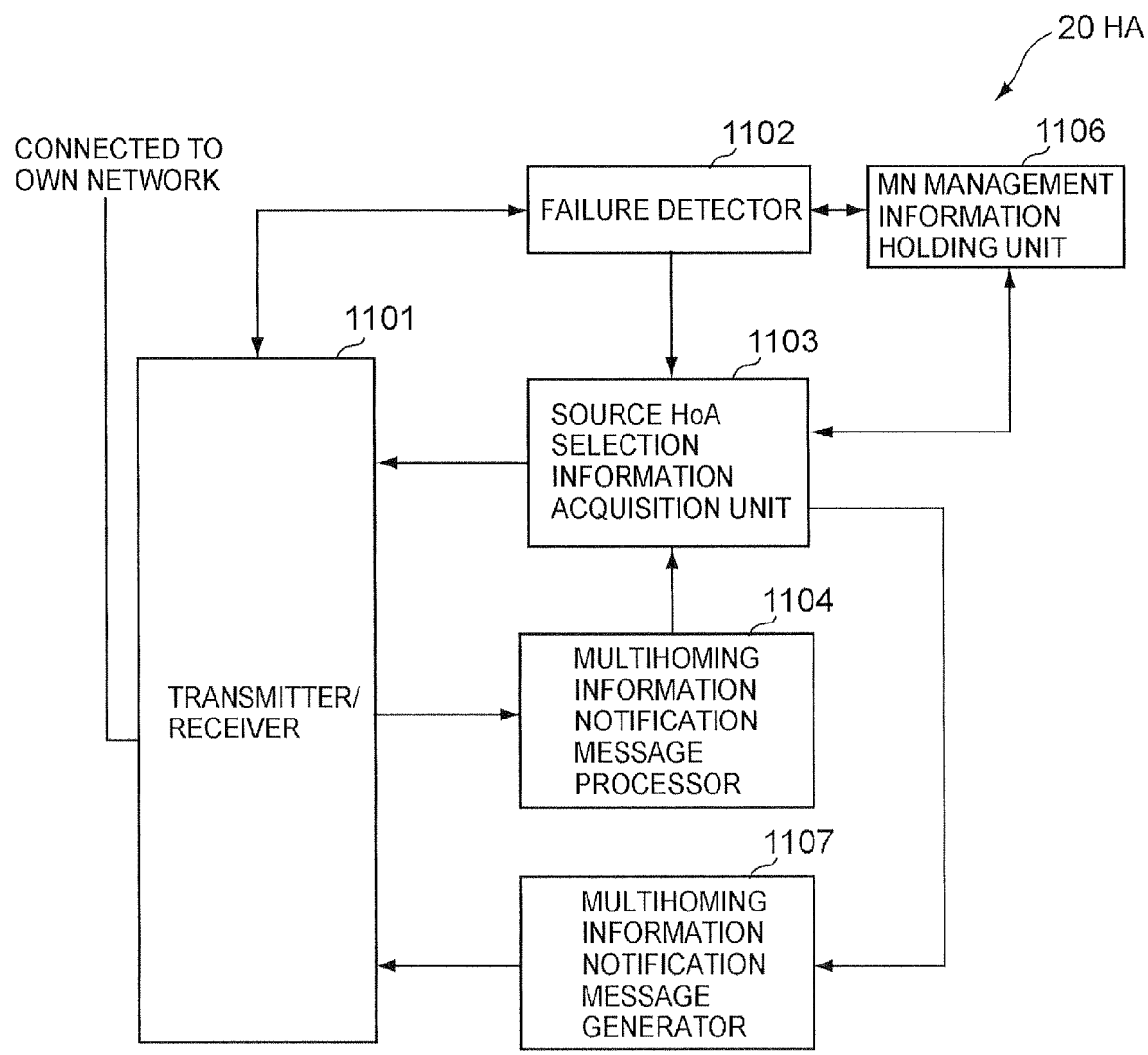
[FIG. 11] A block diagram illustrating an example arrangement for an HA according to the second embodiment of the invention.

Further, FIG. 11 is a block diagram showing an example arrangement of an HA according to the second embodiment of the invention. The HA 20 shown in FIG. 11 includes: a transmitter/receiver 1101, a failure detector 1102, a source HoA selection information acquisition unit 1103, a multihoming information notification message processor 1104, an MN management information holding unit 1106 and a multihoming information notification message generator 1107. Furthermore, the functions performed in the HA 20 are represented using blocks; however, these functions can also be provided using hardware or software.

The arrangement of the HA 20 of the second embodiment of the invention will now be described through a comparison with the arrangement (the arrangement in FIG. 6) of the HA 20 for the first embodiment of the invention. When compared with the arrangement of the HA 20 in the first embodiment of the invention, a difference in the arrangement of the HA 20 for the second embodiment of the invention is that information transmitted to the MN 10 is not desirable HoA information to be used by the MN 10, but information that is useful for the MN 10 for selecting an appropriate HoA.

Accordingly, the source HoA selection information acquisition unit 1103, the multihoming information notification message processor 1104 and the multihoming information notification message generator 1107 shown in FIG. 11 are different from the functions of the source HoA selection information acquisition unit 603, the multihoming information notification message processor 604 and the multihoming information notification message generator 607 shown in FIG. 6. Moreover, for the HA 20 shown in FIG. 11, the source HoA selector 605 provided for the HA 20 shown in FIG. 6 is eliminated.

It should be noted that the same information as described in the first embodiment of the invention can be employed as information that is useful for selecting an appropriate HoA. Further, since the transmitter/receiver 1101, the failure detector 1102 and the MN management information holding unit 1106 of the HA 20 in FIG. 11 are the same as the transmitter/receiver 601, the failure detector 602 and the MN management information holding unit 606 in FIG. 6, no further explanation for them will be given.

The source HoA selection information acquisition unit 1103 has a function whereby, upon receiving an instruction from the failure detector 1102 or the multihoming information notification message processor 1104, in a case wherein information useful for selecting a source HoA is present in the MN management information holding unit 1106, this information is obtained and transmitted to the multihoming information notification message generator 1107, and an instruction is issued to the multihoming information notification message generator 1107 to generate a multihoming information notification message to transmit the information to the MN 10.

Further, the source HoA selection information acquisition unit 1103 has a function that, in a case wherein information useful for selecting a source HoA is not present in the MN management information holding unit 1106, obtains via the transmitter/receiver 1101 the information that is useful for selecting a desirable HoA to be used by the MN 10, and issues an instruction to the MN management information holding unit 1106 to store this information (or newly obtained information, or information to be updated); and that transmits the information to the multihoming information notification message generator 1107 and issues an instruction to the multihoming information notification message generator 1107 to generate a multihoming information notification message in order to notify the MN 10 of this information.

It should be noted that, at an arbitrary timing, the source HoA selection information acquisition unit 1103 may obtain information via the transmitter/receiver 1101.

Furthermore, the multihoming information notification message processor 1104 is a function that performs a process related to a multihoming information notification message that is received from the MN 10, and that includes information indicating a request for information that is useful for selecting a desirable HoA to be used by the MN 10, and that issues an instruction to the source HoA selection information acquisition unit 1103 to obtain information that is useful for selecting a desirable HoA to be used by the MN 10.

In addition, the multihoming information notification message generator 1107 is a function that generates a multihoming information notification message that is transmitted by the source HoA selection information acquisition unit 1103, and that includes information that is useful for selecting a desirable HoA to be used by the MN 10, and transmits this message to the MN 10 via the transmitter/receiver 1101.

The function of the HA in the second embodiment of the invention may be mounted on another node, such as an information server, etc.

As described above, the HA 20 shown in FIG. 11 can obtain information that is useful for selecting a desirable HoA to be used by the MN 10, and can transmit the information to the MN 10. It should be noted that various functions provided by the HA of the second embodiment of the invention can be performed using a protocol, such as a mobile IP provided for the HA, and can also be performed using a special layer that provides multihoming.

A specific operation according to the second embodiment of the present invention will now be described. Assume there is a case wherein the MN 10 is to communicate with the CN 15 when, for example, the MN 10 is connected to the foreign network 2, as shown in FIG. 1. At this time, in a case wherein congestion has occurred on, for example, both the ISP 1 and the ISP2, the source HoA selection information acquisition unit 1103 of the HA 20 detects the levels of the congestions related to the ISP1 and the ISP2, and updates the MN management information in the MN management information holding unit 1106.

And in a case wherein a multihoming information notification message, which includes an instruction to request information that is useful for selecting a desirable HoA to be used by the MN 10, is received from the MN 1, or at an arbitrary voluntary timing (i.e., in the state wherein no request is received from the MN 10), the HA 20 transmits to the MN 10 a multihoming information notification message shown in FIG. 9, representing information related to the congestion levels of the ISP1 and ISP2. For example, in a case wherein the congestion level is lower for the ISP1 than for the ISP2, upon receiving this notification, the source HoA selection information acquisition unit 1103 of the MN 10 determines that the HoA that belongs to the ISP1 is a more appropriate source HoA for an inner packet than the HoA that belongs to the ISP2, and designates PF1.HoA as the source address for an inner packet when a packet to be transmitted to the CN 15 is generated.

Therefore, when the packet transmitted by the MN 10 is decapsulated by the HA 20, the inner packet is passed along the optimal path via the ISP1 whose congestion level is relatively lower, and is delivered to the CN 15.

In a case wherein a plurality of networks are allocated to the MN 10, the MN 10 can obtain, from HAs 20 present in the individual networks, information that is useful for selecting a desirable HoA to be used by the MN 10, and can select an optimal home network and an optimal HoA by comparing the obtained information. Further, at this time, the MN 10 may consider the operating states and load imposed states of the HAs 20 when selecting an HoA.

As described above, according to the second embodiment of the invention, the MN 10 can obtain, from the HA 20, information useful for selecting a desirable HoA that is to be used as a source address for an inner packet. And since the HoA is selected based on this information, and is designated as a source address for an inner packet, when an encapsulated packet transmitted by the MN 10 is decapsulated by the HA 20, the inner packet is transferred from the HA 20 and delivered to the CN 15 through an ISP appropriate for the MN 10. In addition, since the MN 10 can obtain at the same time, from the HA 20, information that is useful for selecting a desirable address for the HA 20 to be used as a destination address for the external header of an encapsulated packet, the optimal destination address for the external header of the encapsulated packet and the optimal source address of the inner packet can be designated, while taking into account both useful information for HA address selection and useful information for HoA selection.

Third Embodiment

Figure 12:
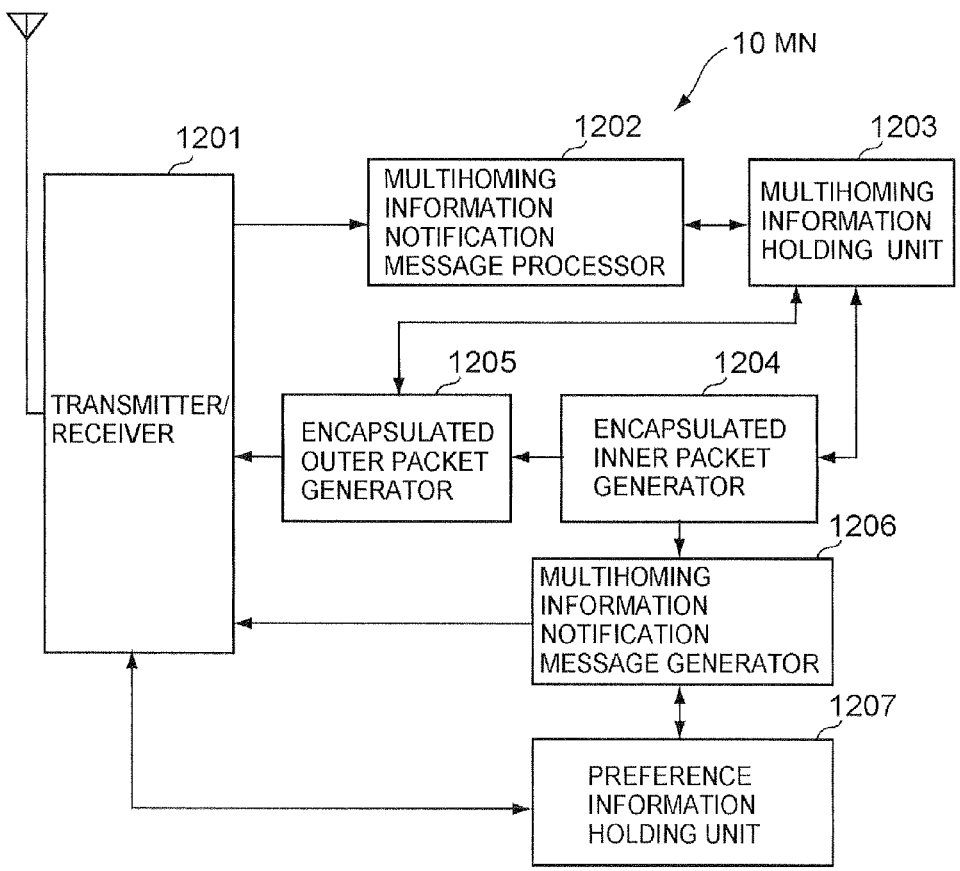
[FIG. 12] A block diagram illustrating an example arrangement for an MN according to a third embodiment of the present invention.

Next, a third embodiment of the present invention will be described. FIG. 12 is a block diagram showing an example arrangement for an MN of the third embodiment of the invention. It should be noted that an MN 10 shown in FIG. 12 corresponds to the MN 10 in FIG. 1. The MN 10 in FIG. 12 includes: a transmitter/receiver 1201, a multihoming information notification message processor 1202, a multihoming information holding unit 1203, an encapsulated inner packet generator 1204, an encapsulated outer packet generator 1205, a multihoming information notification message generator 1206 and a preference information holding unit 1207. Further, in FIG. 12, the functions performed in the MN 10 are represented using blocks; these functions can also be provided by hardware or software.

The arrangement of the MN 10 for the third embodiment of the invention will now be described by comparing it with the arrangement (the arrangement in FIG. 2) for the MN 10 of the first embodiment of the invention. In a case wherein a comparison is made with the arrangement of the MN 10 in the first embodiment of the invention, a difference in the arrangement of the MN 10 of the third embodiment of the invention is that preference information for the MN 10 is inserted in a multihoming information notification message that is to be transmitted by the MN 10 to the HA 20 to request appropriate HoA information.

Accordingly, the function of the multihoming information notification message processor 1202 shown in FIG. 12 is different from the function of the multihoming information notification message processor 202 shown in FIG. 2. Further, for the MN 10 shown in FIG. 12, a preference information holding unit 1207 is additionally provided.

It should be noted that the same information as described in the first embodiment of the invention can be employed as information useful for selecting an appropriate HoA. Further, since the transmitter/receiver 1201, the multihoming information notification message processor 1202, the multihoming information holding unit 1203, the encapsulated inner packet generator 1204 and the encapsulated outer packet generator 1205 of the MN 10 shown in FIG. 12 are the same as the transmitter/receiver 201, the multihoming information notification message processor 202, the multihoming information holding unit 203, the encapsulated inner packet generator 204 and the encapsulated outer packet generator 205 of the MN 10 of the MN 10 in FIG. 2, no further explanation for them will be given.

Figure 13:
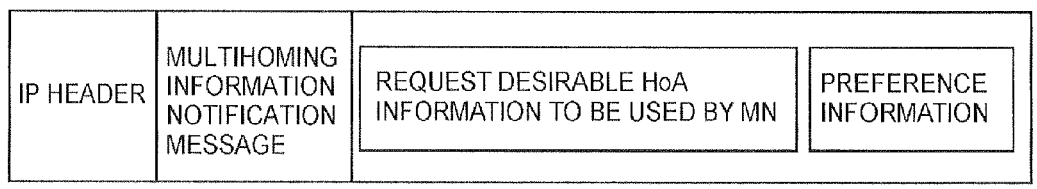
[FIG. 13] A diagram illustrating an example structure for a multihoming information notification message for requesting desirable HoA information to be employed by the MN according to the third embodiment of the invention.

The multihoming information notification message generator 1206 is a function that, in accordance with an instruction received from the encapsulated inner packet generator 1204, obtains preference information held in the preference information holding unit 1207 and generates a multihoming information notification message (see FIG. 13).

FIG. 13 is a diagram showing an example structure, for the third embodiment of the invention, of a multihoming information notification message used to request desirable HoA information to be used by the MN. A multihoming information notification message to be transmitted from the MN 10 to the HA 20 includes: an IP header; information (e.g., a flag) indicating that this message is a multihoming information notification message; and a field (preference information field) for inserting information that requests desirable information to be used by the MN 10, and current preference information for the MN 10 that is held in the preference information holding unit 1207.

Furthermore, the preference information holding unit 1207 is a function that holds the preference information that is obtained via the transmitter/receiver 1201, preference information generated by the MN 10, or preference information designated by the user of the MN 10. It should be noted that the preference information held in the preference information holding unit 1207 is a selection condition grasped by the MN 10 for a source HoA, which has been referred to in the second embodiment of the invention.

The multihoming information notification message has been transmitted to the HA in accordance with the instruction received from the encapsulated inner packet generator 1204 (i.e., a timing for an inquiry by an HoA designated as a destination HoA for an inner packet). In addition to this, for example, at a timing at which new preference information is added to the preference information holding unit 1207, or a timing at which existing preference information is updated, a multihoming information notification message that includes this preference information (a difference in preference information) may be transmitted.

As described above, the MN 10 shown in FIG. 12 can not only transmit the preference information to the HA 20 for the MN 10, but can also obtain from the HA, for the MN 10, information related to a desirable HoA that is to be used as a source address for an inner packet. It should be noted that various functions provided by the MN of the third embodiment of the invention can be performed using a protocol, such as a mobile IP supplied by the MN, and can also be performed by a special layer that provides multihoming.

Figure 14:
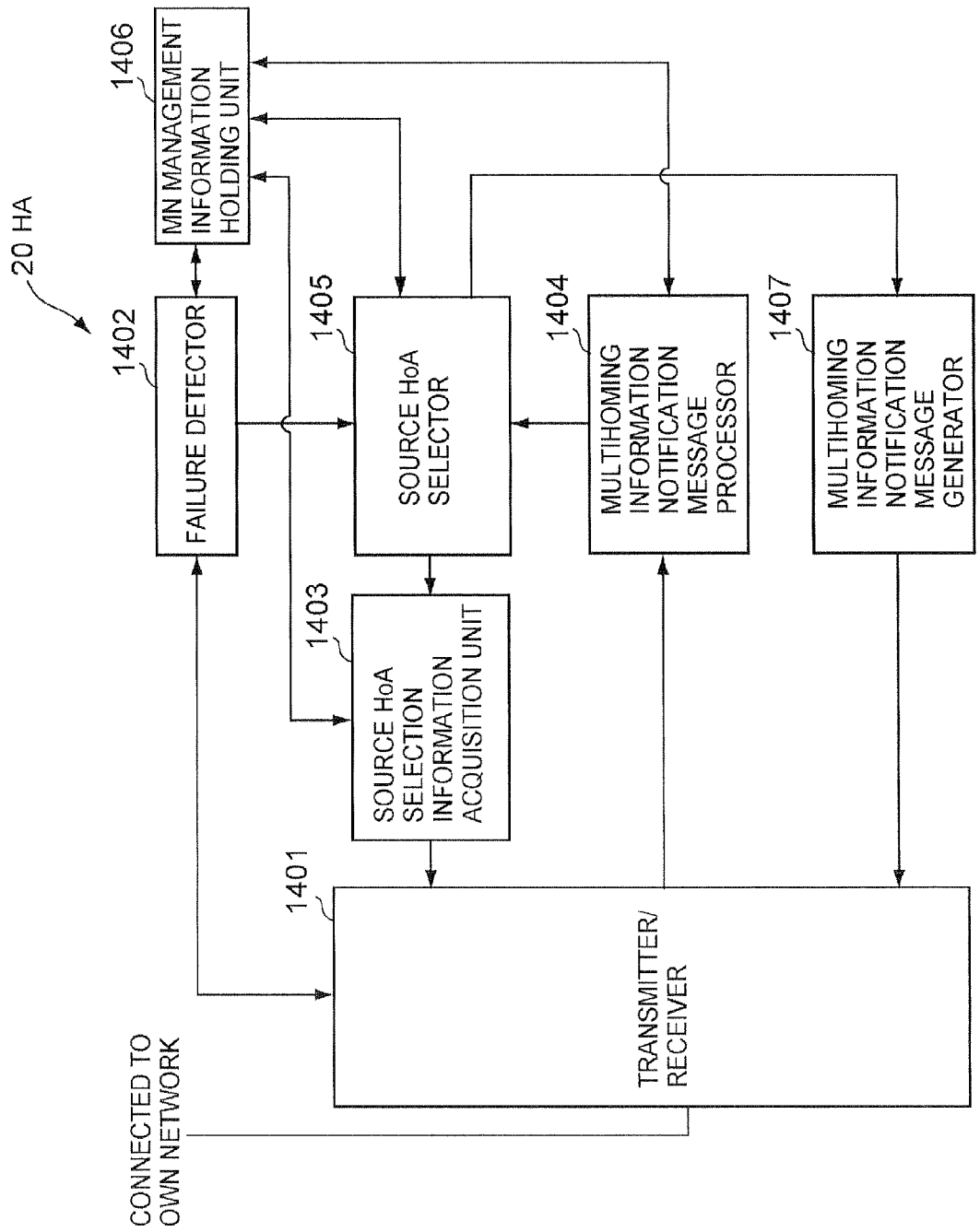
[FIG. 14] A block diagram illustrating an example arrangement for the HA according to the third embodiment of the invention.

Furthermore, FIG. 14 is a block diagram illustrating an example arrangement of the HA according to the third embodiment of the invention. The HA 20 shown in FIG. 14 includes: a transmitter/receiver 1401, a failure detector 1402, a source HoA selection information acquisition unit 1403, a multihoming information notification message processor 1404, a source HoA selector 1405, an MN management information holding unit 1406 and a multihoming information notification message generator 1407. Further, in FIG. 14, the functions provided by the HA are represented using blocks; these functions can also be provided by hardware or software.

The arrangement of the HA 20 of the third embodiment of the invention will now be described by being compared with the arrangement (the arrangement in FIG. 6) of the HA 20 of the first embodiment of the invention. In a case of a comparison with the arrangement of the HA 20 of the first embodiment of the invention, a difference in the arrangement of the HA 20 of the third embodiment of the invention is that preference information for the MN 10 is included in a multihoming information notification message received from the MN 10, and the HA 20 selects an HoA by also referring to the reference information received from the MN 10.

Accordingly, the functions of the multihoming information notification message processor 1404, the source HoA selector 1405 and the MN management information holding unit 1406 shown in FIG. 14 are different from the multihoming information notification message processor 604, the source HoA selector 605 and the MN management information holding unit 606 shown in FIG. 6.

It should be noted that the same information as described in the first embodiment of the invention can be employed as information useful for selecting an appropriate HoA. Further, since the transmitter/receiver 1401, the failure detector 1402, the source HoA selection information acquisition unit 1403 and the multihoming information notification message generator 1407 of the MN 10 in FIG. 14 are the same as the transmitter/receiver 601, the failure detector 602, the source HoA selection information acquisition unit 603 and the multihoming information notification message generator 607 of the MN 10 in FIG. 6, no further explanation for them will be given.

The multihoming information notification message processor 1404 is a function that performs a process related to a multihoming information notification message (see FIG. 13), received from the MN 10, that includes information indicating a request for desirable HoA information to be used by the MN 10 and preference information; and issues an instruction to the source HoA selector 1405 to select a desirable HoA to be used by the MN 10, and issues an instruction to the MN management information holding unit 1406 to hold the preference information.

Further, the source HoA selector 1405 includes a function that, when an instruction is received from the failure detector 1402 or the multihoming information notification message processor 1404, in a case wherein useful information for selecting a source HoA is present in the MN management information holding unit 1406, obtains this information and preference information received from the MN 10 and employs the obtained information to select an appropriate HoA; and issues an instruction to the multihoming information notification message generator 1407 to generate a multihoming information notification message to notify the MN 10 of the selected HoA information.

In addition, the source HoA selector 1405 includes a function that, in a case wherein useful information for selecting a source HoA is not present in the MN management information holding unit 1406, issues an instruction to the source HoA selection information acquisition unit 1403 to obtain necessary information; selects an appropriate HoA using information obtained by the source HoA selection information acquisition unit 1403 and the preference information received from the MN 10; and issues an instruction to the multihoming information notification message generator 1407 to generate a multihoming information notification message to notify the MN 10 of the selected HoA information.

It should be noted that the same information as described in the first embodiment of the invention can be employed as useful information for selecting a desirable HoA to be used by the MN 10. Furthermore, the source HoA selector 1405 may select an HoA, not only upon receiving an instruction from the multihoming information notification message processor 1404, but also voluntarily, at a timing at which, for example, the source HoA selection information acquisition unit 1403 detects the change in the status, and the MN management information in the MN management information holding unit 1406 is updated (i.e., unilaterally without receiving any request from the MN 10). And the selected HoA may be transmitted to the MN 10 via the multihoming information notification message generator 1407.

In addition, the MN management information holding unit 1406 is a function that holds information (information included in the MN management information in FIG. 15) that is referred to by the source HoA selector 1504 when selecting a desirable HoA to be used by the MN 10. For the selection of a desirable HoA to be used by the MN 10, the source HoA selector 1405 refers to information useful for selecting a desirable HoA to be used by the MN 10, and preference information. Further, so long as an HoA to be employed by the MN can be identified, arbitrary information can be employed as selected HoA information to be transmitted as a multihoming information notification message. For example, an HoA, the prefix of this HoA, or information indicating an ISP that transmits this prefix may be employed.

Figure 15:
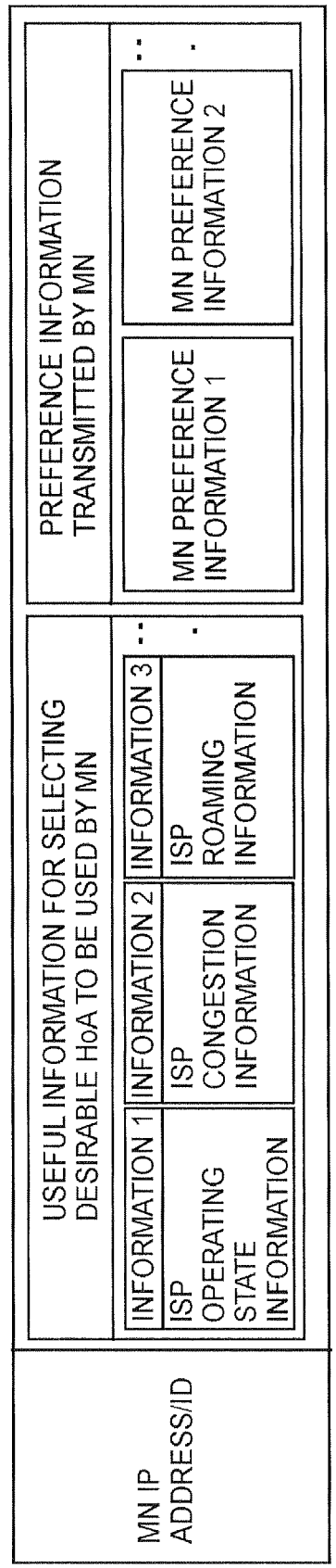
[FIG. 15] A diagram illustrating an example structure for MN management information held by the MN management information holding unit of the HA according to the third embodiment of the invention.
Figure 16:
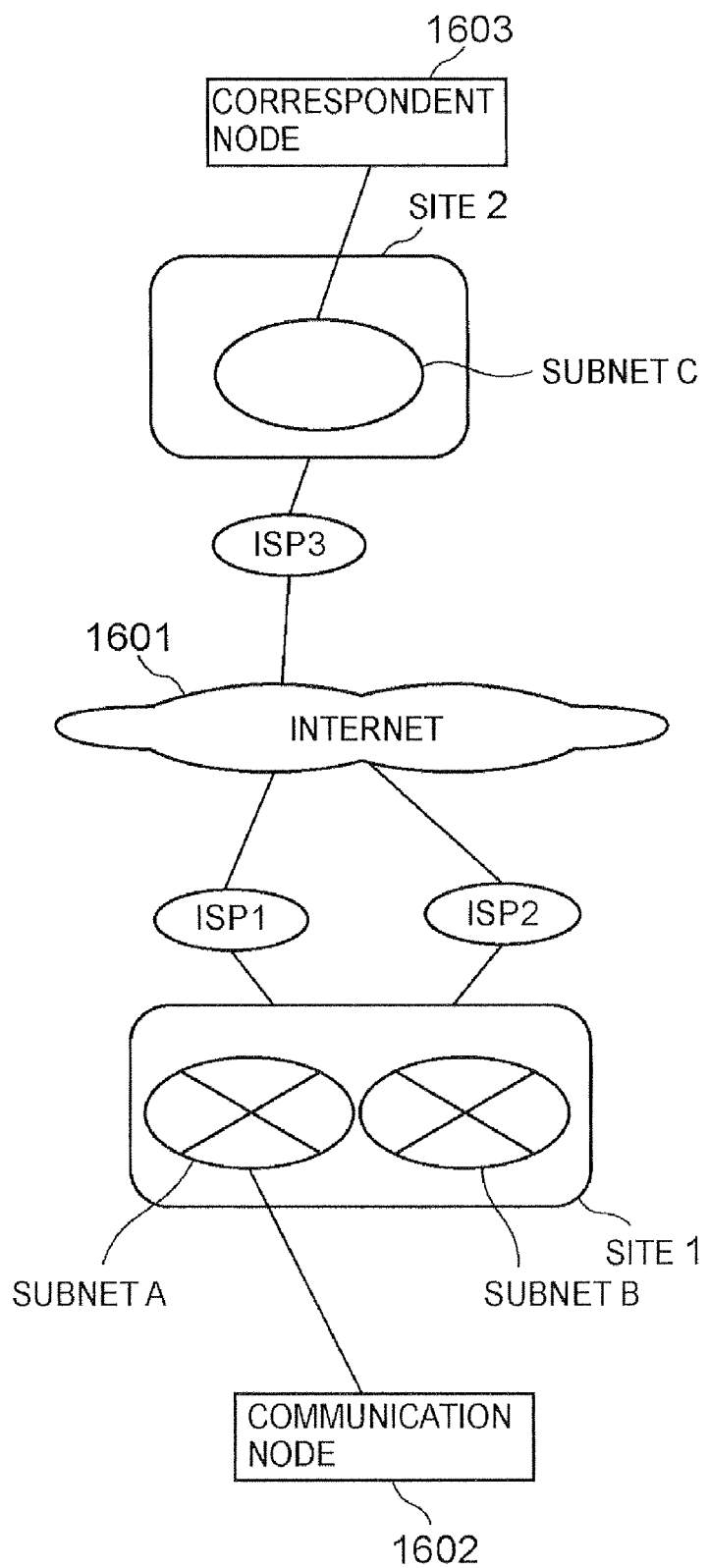
[FIG. 16] A diagram illustrating an example network configuration for explaining site multihoming for conventional art.
Figure 17:
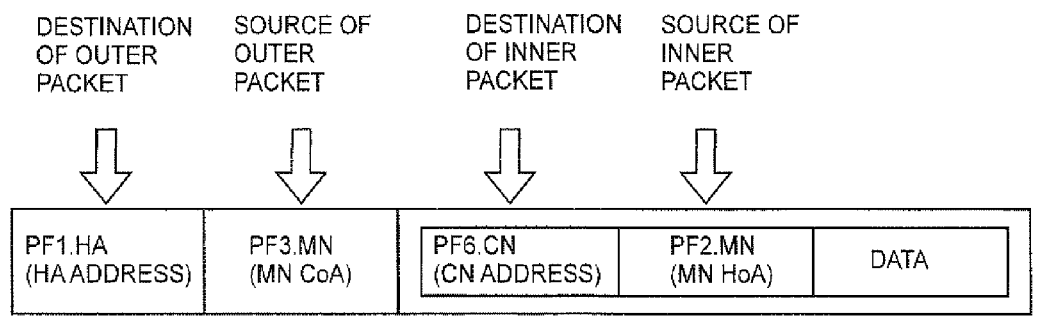
[FIG. 17] A diagram illustrating an example encapsulated packet that is generated for the conventional art in a case wherein an MN transmits a packet to a correspondent node.

FIG. 15 is a diagram showing an example structure for the MN management information held by the MN management information holding unit of the HA according to the third embodiment of the invention. As shown in FIG. 15, for the MN management information, entries are prepared for the individual MNs 10 managed by the HA 20, and useful information is held for selecting a desirable HoA to be used by the MN 10.

As shown in FIG. 15, various useful information for selecting a desirable HoA to be used by the MN 10 and preference information received from the MN 10 can be stored in the entry of the management information, in correlation with the IP address/ID of each MN 10 that is managed by the HA 20. In the MN management information, information obtained by the source HoA selection information acquisition unit 1403, is stored as information useful for selecting a desirable HoA to be used by the MN 10. However, for example, information manually designated by the operator of the HA 20 may be entered.

Further, a binding cache, which is to be used to manage binding information transmitted by the MN 10, may be extended and employed as MN management information that includes useful information for selecting a desirable HoA to be used by the MN 10.

Furthermore, the function of the HA in the third embodiment of the invention may be mounted on another node, such as an information server, etc. It should be noted that various functions provided by the HA of the third embodiment of the invention can be performed using a protocol, such as a mobile IP supplied with the HA, and can also be performed using a special layer that provides multihoming.

Next, a specific operation for the third embodiment of the invention will be described. Assume there is a case wherein the MN 10 is to communicate with the CN 15 when, for example, as shown in FIG. 1, the MN 10 is connected to the foreign network 2. At this time, for example, in a case wherein new preference information for the MN 10 (information indicating that not the ISP1, but the ISP2 was used) is additionally provided for the preference information holding unit 1207 of the MN 10, the MN 10 transmits to the HA 20 a multihoming information notification message that includes this preference information.

Upon receiving this multihoming information notification message, the HA 20 updates the MN management information in the MN management information holding unit 1406 by adding the information, and employs the updated MN management information to select an HoA. At this time, when there is no information to be considered prior to the preference information for the MN 10, the HA 20 transmits to MN 10 a notification indicating that the HoA belonging to the ISP2 should be used. However, in a case wherein information indicating, for example, the ISP2 is not being operated due to a failure is stored, the HA 20 transmits to the MN 10 a notification indicating that the HoA belonging to the ISP1 should be employed.

As a result, the MN 10 can designate, as a source HoA for an inner packet, the HoA that was selected while referring to the preference information for the MN 10 and the information held by the HA 20. Therefore, a packet can be delivered to the CN 15 along an optimal path in compliance with the request of the MN 10, without causing a destination unreachable.

As described above, according to the third embodiment of the invention, the MN 10 can transmit, to the HA 20, preference information for the MN 10 that is desired for use as one of the address selection conditions, and can obtain HoA information that is selected by the HA 20 while taking this preference information into account. Further, since this HoA is designated as the source address of an inner packet, when an encapsulated packet transmitted by the MN 10 is decapsulated by the HA 20, the inner packet is transferred from the HA 20 and is delivered to the CN 15 along an appropriate ISP for the MN 10.

According to the individual embodiments of the invention, the technique related to the present invention has been described in detail by employing an example wherein an appropriate ISP is selected for packet transmission based on the state of the ISP and the roaming state. However, the technique taught by this invention can also be applied for a case wherein is selected an appropriate network for performing a packet transfer in an environment that enables the selection of a plurality of networks, or for an environment wherein an address or a network prefix, and the characteristics of a network to be passed through or a network service (a communication speed, a band, a delay fluctuation, etc.) to be provided are selected in correlation with each other (i.e., an environment wherein the main purpose is the performance of a packet transfer based on an address (prefix)), so that a desirable packet communication path can be selected. Furthermore, the technical idea of the present invention is not limited to the above described technique, but also can be applied for the general technique for selecting a desirable packet communication path.

It should be noted that the individual functional blocks employed for the explanation of the individual embodiments of the present invention are obtained typically as LSI (Large Scale Integration) integrated circuits. These may be formed as individual chips, or may be formed as a single chip so as to cover part or all of them. It should be noted that an LSI is employed here, but depending on differences in the integration density, this may also be called an IC (Integrated Circuit), a system LSI, a super LSI or an ultra LSI.

Additionally, the integrated circuit formation method is not limited to the LSI, but is also applicable to a dedicated circuit or a general-purpose processor that may be employed. An FPGA (Field Programmable Gate Array) that is programmable after an LSI is produced, or a reconfigurable processor, for which the connection and the setup of a circuit cell inside an LSI is reconfigurable, may also be employed.

Moreover, when an integrated circuit technology that is employed in an LSI has appeared as a result of the development of semiconductor technology or another derivative technology, naturally, integration of the functional blocks may be performed using this technology. For example, it is possible that biotechnology may be adapted for use.

INDUSTRIAL APPLICABILITY

The present invention provides such effects that, while the MN is separated from the home network, the status available on a home network is obtained and a communication path is optimized for a packet to be transmitted between the MN and the CN via the HA, and can be applied for a technique related to a communication using an IP and a technique that can provide both a multihoming function, and a mobile function.

The invention claimed is:

1. An address management node, which manages a home address for a mobile node, comprising:
   a transmitter/receiver that communicates wirelessly with the mobile node;
   an address management section that manages a plurality of home addresses assigned to the mobile node;
   a home address selection condition acquisition section that acquires selection condition information that is referred to for selection of an appropriate home address that it is desirable the mobile node employs;
   a home address selection section that selects the appropriate home address from among the plurality of home addresses, based on the selection condition information obtained by the home address selection condition acquisition section;
   a home address notification section that notifies the mobile node, through the transmitter/receiver, of the appropriate home address selected by the home address selection section; and
   a failure detection section that detects a failure related to a communication by the mobile node, and for determining the need for the mobile node to change the appropriate home address to be set as a source address in a packet that is to be transmitted,
   wherein, in a case in which the failure detection section determines that a change in the appropriate home address is required, the home address selection condition acquisition section obtains new selection condition information, the home address selection section newly selects an appropriate home address, and the home address notification section notifies the mobile node, through the transmitter/receiver, of the appropriate home address that has been newly selected by the home address selection section for a case wherein a change in the appropriate home address is required.

2. The address management node according to claim 1, wherein the selection condition information is at least one of: operating state information, indicating an operating state of an ISP to which a site, at which the address management node is present, is currently connected; congestion information, indicating whether congestion has occurred in the ISP; roaming information for the ISP; inner packet transfer destination status information, indicating a transfer destination for the packet; priority information, indicating a priority level for the ISP; QoS path state information, indicating a QoS path state for a communication path in the ISP; delivery status information, indicating a delivery status for a packet relative to a transfer destination; and connection link stability information, indicating whether there is a stable connection link between the address management node and the ISP.

3. An address management node, which manages a home address for a mobile node, comprising:
   a transmitter/receiver that communicates wirelessly with the mobile node;
   an address management section that manages a plurality of home addresses assigned to the mobile node;
   a home address selection condition acquisition section that acquires selection condition information that is to be referred to for selection of an appropriate home address that it is desirable the mobile node employs;
   a selection condition information notification section that notifies the mobile node, through the transmitter/receiver, of the selection condition information that has been obtained by the home address selection condition acquisition section; and
   a failure detection section that detects a failure that affects a setup for the appropriate home address and that is related to a communication by the mobile node,
   wherein the home address selection condition acquisition section acquires new selection condition information that is generated due to the failure, detected by the failure detection section, that is related to a communication by the mobile node, and
   wherein the selection condition information notification section notifies the mobile node, through the transmitter/receiver, of the new selection condition information obtained by the home address selection condition acquisition section.

4. A mobile node, to which a plurality of home addresses are assigned by an address management node, comprising:
   a transmitter/receiver that communicates wirelessly with the address management node;
   a home address reception section that receives, from the address management node through the transmitter/receiver, an appropriate home address that it is desirable the mobile node employs; and
   a source address setup section that sets the appropriate home address as a source address for an inner packet included in an encapsulated packet that is to be transmitted, to a predetermined correspondent node, via the address management node,
   wherein, in a case wherein the address management node detects a failure related to a communication by the mobile node, determines that a change in the appropriate home address is required, obtains new selection condition information, newly selects an appropriate home address, and notifies the mobile node of the appropriate home address that has been newly selected for a case wherein a change in the appropriate home address is required, the home address reception section receives, from the address management node through the transmitter/receiver, the appropriate home address that has been selected by the address management node, and the source address setup section sets the appropriate home address that has been selected by the address management node as a source address for an inner packet included in an encapsulated packet that is to be transmitted, to a predetermined correspondent node, via the address management node.

5. A mobile node, to which a plurality of home addresses are assigned by an address management node, comprising:
   a transmitter/receiver that communicates wirelessly with the address management node;
   a home address selection condition reception section that obtains selection condition information to be referred to for selection of an appropriate home address it is desirable that the mobile node employs;
   a home address selection section that selects the appropriate home address from among the plurality of home addresses based on the selection condition information received by the home address selection condition reception section; and a source address setup section that sets the appropriate home address as a source address for an inner packet included in an encapsulated packet that is to be transmitted to a predetermined correspondent node via the address management node, wherein, in a case wherein the address management node detects a failure that affects a setup for the appropriate home address and that is related to a communication by the mobile node, acquires new selection condition information that is generated due to the detected failure that is related to the communication by the mobile node, and notifies the mobile node of the new selection condition information, the home address selection condition reception section receives, from the address management node through the transmitter/receiver, the new selection condition information, the home address selection section selects an appropriate home address from among the plurality of home addresses based on the new selection condition information received from the address management node through the transmitter/receiver, and the source address setup section sets the appropriate home address that has been selected based on the new selection condition information as a source address for an inner packet included in an encapsulated packet that is to be transmitted, to a predetermined correspondent node, via the address management node.

* * * * *